US011636088B2

(12) United States Patent
Sexton

(10) Patent No.: US 11,636,088 B2
(45) Date of Patent: Apr. 25, 2023

(54) SYSTEMS AND METHODS TO FACILITATE RAPID DATA ENTRY FOR DOCUMENT REVIEW

(71) Applicant: JND HOLDINGS LLC, Seattle, WA (US)

(72) Inventor: Benjamin David Sexton, Stillwater, MN (US)

(73) Assignee: JND HOLDINGS LLC, Seattle, WA (US)

( * ) Notice: Subject to any disclaimer, the term of this patent is extended or adjusted under 35 U.S.C. 154(b) by 245 days.

(21) Appl. No.: 16/909,506

(22) Filed: Jun. 23, 2020

(65) Prior Publication Data

US 2020/0401574 A1    Dec. 24, 2020

Related U.S. Application Data

(60) Provisional application No. 62/865,760, filed on Jun. 24, 2019.

(51) Int. Cl.
*G06F 16/23*     (2019.01)
*G06F 3/048*     (2013.01)
*G06F 16/22*     (2019.01)
*G06F 16/2455*   (2019.01)

(52) U.S. Cl.
CPC ......... *G06F 16/2358* (2019.01); *G06F 3/048* (2013.01); *G06F 16/22* (2019.01); *G06F 16/235* (2019.01); *G06F 16/24561* (2019.01)

(58) Field of Classification Search
CPC ............. G06F 16/2358; G06F 16/22; G06F 16/24561; G06F 16/235; G06F 3/048; G06F 16/93; G06F 16/168; G06F 16/2237; G06F 16/2264; G06F 16/252; G06F 3/0484

See application file for complete search history.

(56) References Cited

U.S. PATENT DOCUMENTS

| 7,895,511 | B2 | 2/2011 | Aureglia et al. |
| 8,213,856 | B2 | 7/2012 | McGinley et al. |
| 8,918,712 | B2 | 12/2014 | Nario et al. |
| 9,953,011 | B1 | 4/2018 | Anderson et al. |
| 10,380,147 | B1* | 8/2019 | Omland .............. G06F 16/30 |
| 10,795,555 | B2* | 10/2020 | Burke ............... G06F 16/252 |
| 2004/0059742 | A1* | 3/2004 | Altman .............. G06F 16/93 |
| 2009/0089315 | A1 | 4/2009 | Jeffery et al. |
| 2017/0147540 | A1* | 5/2017 | McCormick ........ G06F 40/194 |
| 2017/0220536 | A1* | 8/2017 | Chiba ............... G06F 40/232 |
| 2018/0157467 | A1* | 6/2018 | Stachura ............. G06F 8/30 |

OTHER PUBLICATIONS

International Search Report and Written Opionion, dated Sep. 29, 2020, received in International Application No. PCT/US20/39408.

* cited by examiner

*Primary Examiner* — Huawen A Peng
(74) *Attorney, Agent, or Firm* — Davis Wright Tremaine LLP; George C. Rondeau, Jr.; Heather M. Colburn

(57) ABSTRACT

A computer-implemented method that includes generating a graphical user interface including a coding interface and a document viewer interface. The coding interface displays a grid that includes a plurality of cells representing a plurality of documents and a plurality of fields. A selection of one of the cells is received. The cell represents a selected one of the documents, and a selected one of the fields. A rendering of the selected document is automatically displayed in the document viewer interface. A value entered into the selected cell is received and the value is transmitted to a database for storage thereby.

24 Claims, 23 Drawing Sheets

SYSTEMS AND METHODS TO FACILITATE RAPID DATA ENTRY FOR DOCUMENT REVIEW

CROSS REFERENCE TO RELATED APPLICATION

This application claims the benefit of U.S. Provisional Application No. 62/865,760, filed on Jun. 24, 2019, which is incorporated herein by reference in its entirety.

BACKGROUND OF THE INVENTION

Field of the Invention

The present invention is directed generally to systems and interfaces used to perform document coding.

Description of the Related Art

Electronic Discovery ("E-Discovery") is the field that addresses the identification and production of electronic evidence ("documents") relevant to a digital investigation and/or litigation. The process of identifying documents relevant to a legal dispute typically involves three phases:
1. A document collection phase, during which documents are harvested from a source media and indexed in a searchable database, establishing a document corpus;
2. An Early Case Assessment ("ECA") Phase, during which queries and analytic operations are run against the document corpus to eliminate irrelevant documents and narrow the potentially relevant document universe prior to a human review phase; and
3. A human review phase, during which attorneys make human determinations as to the relevance of each document in at least a portion of the document corpus.

Mounting document corpora has made the third phase, human review, increasingly time consuming and costly. Each relevance determination made by an attorney during the Human Review Phase costs approximately $1.25 based on industry averages. In a modern litigation, initial document corpora regularly exceed 10 million ("MM") potentially relevant documents, of which less than 1% are often deemed relevant. Given the significant time and cost burden associated with human review, significant value is placed on systems that reduce the human time required to complete a document review. Saving just seconds per document can result in significant time savings and cost reduction. Additionally, a more efficient interface can reduce calls to a server as well as network traffic.

BRIEF DESCRIPTION OF THE SEVERAL VIEWS OF THE DRAWING(S)

Various embodiments in accordance with the present disclosure will be described with reference to the following drawings.

Like reference numerals have been used in the figures to identify like components.

DETAILED DESCRIPTION OF THE INVENTION

Electronic evidence is referred to herein as being one or more "documents." However, such electronic evidence need not be a conventional document and includes other types of evidence produced during discovery, such as electronic documents, electronic mail ("email"), text messages, electronic records, contracts, audio recordings, voice messages, video recordings, digital images, digital models, physical models, a structured data set, an unstructured data set, and the like.

Document coding refers to the process of entering data with respect to a particular document. Document coding may be characterized as including one or more coding decisions that are made by a human user who is entering the document coding. For example, some of the data entered may be selected from a plurality of predetermined options. The process of selecting one of these predetermined options may be characterized as being a coding decision.

Figure 1A:
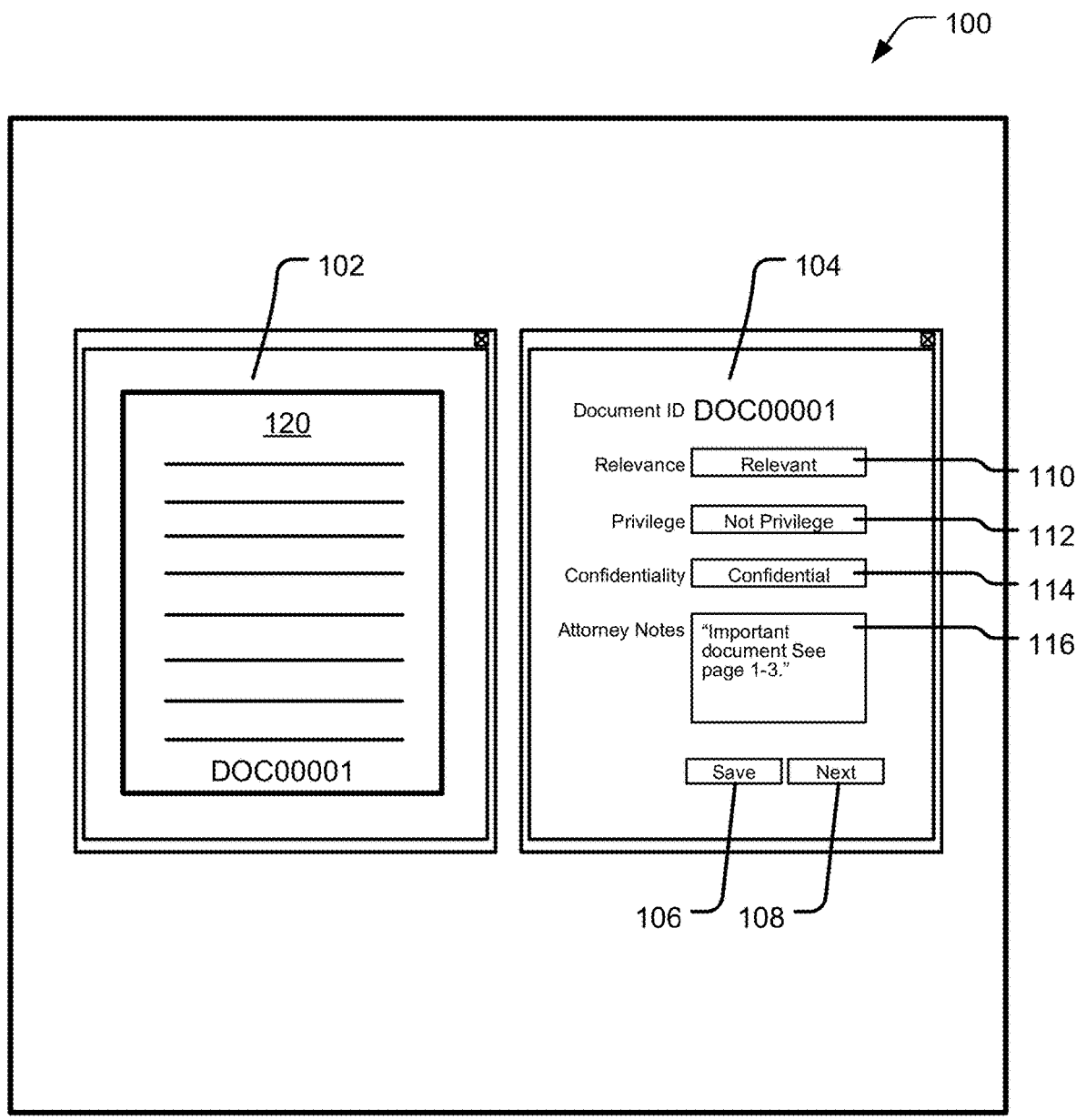
FIG. 1A is an illustration of a prior art coding interface displaying a first document in a document viewer and coding information for the first document in a document coding form.
Figure 1B:
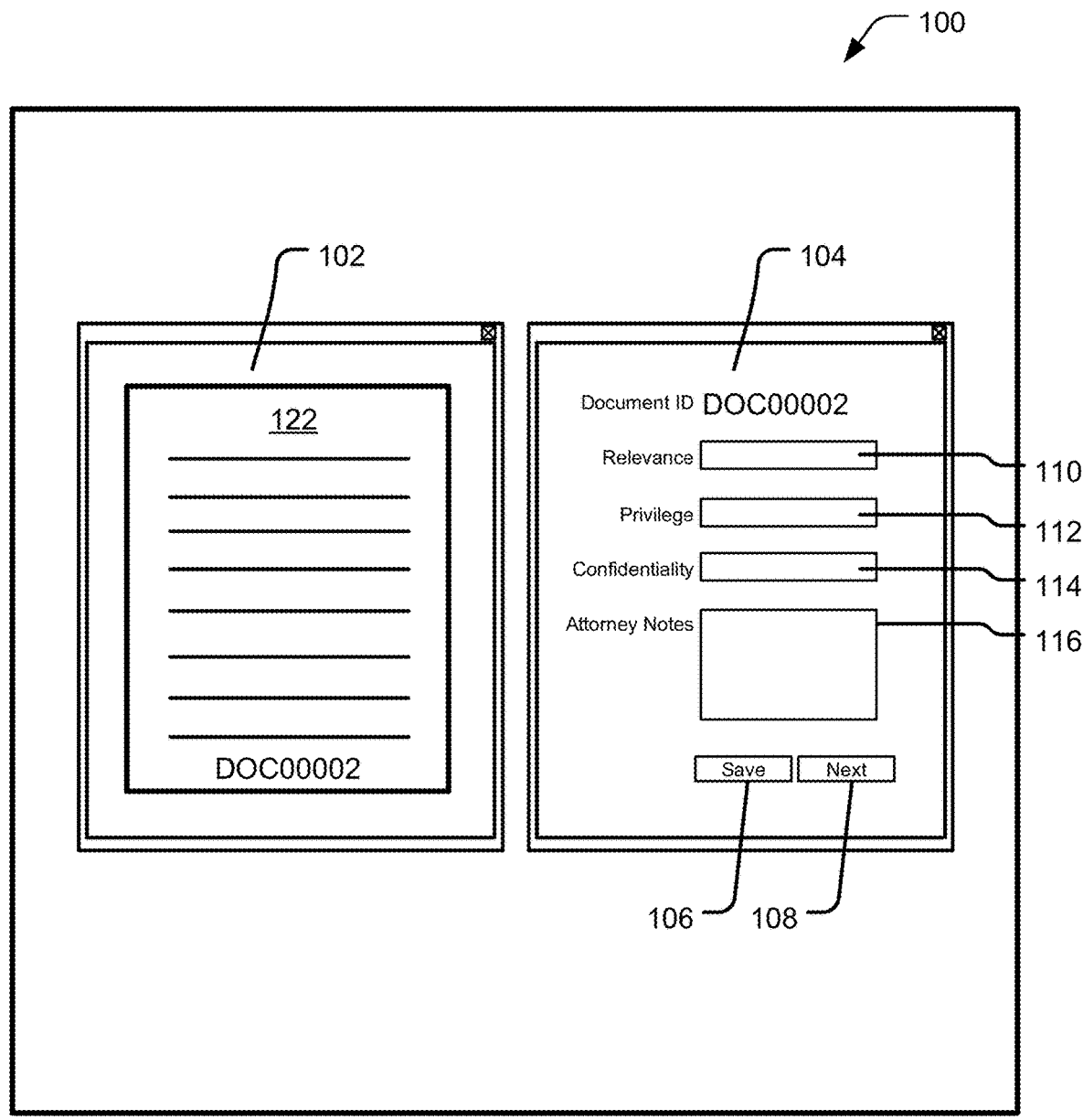
FIG. 1B is an illustration of the prior art coding interface displaying a second document in the document viewer and coding information for the second document in the document coding form.

Referring to FIG. 1A, most commercially available document review platforms offer a coding interface 100 constructed of two parts: (1) a document viewer 102; and (2) a document coding form 104. The document coding form 104 may also be referred to as a coding pane. The document coding form 104 includes user inputs 110-116 for receiving document coding resulting from one or more coding decisions made by a user. A rendering 120 of a particular document is presented in the document viewer 102, and coding decisions for the particular document are entered by the user into the user inputs 110-116 of the document coding form 104. The document coding entered into the user inputs 110-116 may be stored in database fields (e.g., for a relevance field, a privilege field, a confidentiality field, and an attorney notes field, respectively). The document coding form 104 includes a submit user input 106 (e.g., a "save" button) and a next document user input 108 (e.g., a "next" button). When selected, the submit user input 106 submits the coding decisions entered into the user inputs 110-116 to a database (not shown). When selected, the next document user input 108 advances the user to a next document in a review queue (not shown) associated with the user. In other words, referring to FIG. 1B, the document viewer 102 displays a rendering 122 of the next document and the document coding form 104 displays the user inputs 110-116, which are configured to receive coding decisions related to the next document.

Referring to FIG. 1A, in a traditional document review workflow, the user applies coding decisions to a selected document (e.g., the document having a value "DOC0001" stored in the document ID field) according to the following steps:

1. The user reviews the rendering 120 of the selected document in the document viewer 102;
2. The user enters information (e.g., coding decisions) about or related to the selected document into the user inputs 110-116 of the document coding form 104;
3. The user selects the submit user input 106, which submits the information (e.g., coding decisions) entered into the document coding form 104 to the database (not shown);
4. Software writes the submitted information into the database, which links the information (e.g., coding decisions) to the selected document;
5. The user navigates to the next document in the user's review queue by selecting the next document user input 108;
6. The next document is loaded by the document viewer 102 and, referring to FIG. 1B, the rendering 122 is displayed to the user by the document viewer 102; and
7. The document coding form 104 automatically displays the user inputs 110-116 for the next document (e.g., the document having a value "DOC0002" stored in the document ID field), which is now the selected document.

In step 7 above, if the next document has not yet been coded, the document coding form 104 refreshes with a blank form (e.g., the user inputs 110-116 are blank) for the next document, which is now the selected document. The steps 1-7 above are repeated until all of the documents in the user's review queue have been coded. Thus, the coding interface 100 allows the user to view information (e.g., coding decisions) entered for only a single document at a time.

Figure 2:
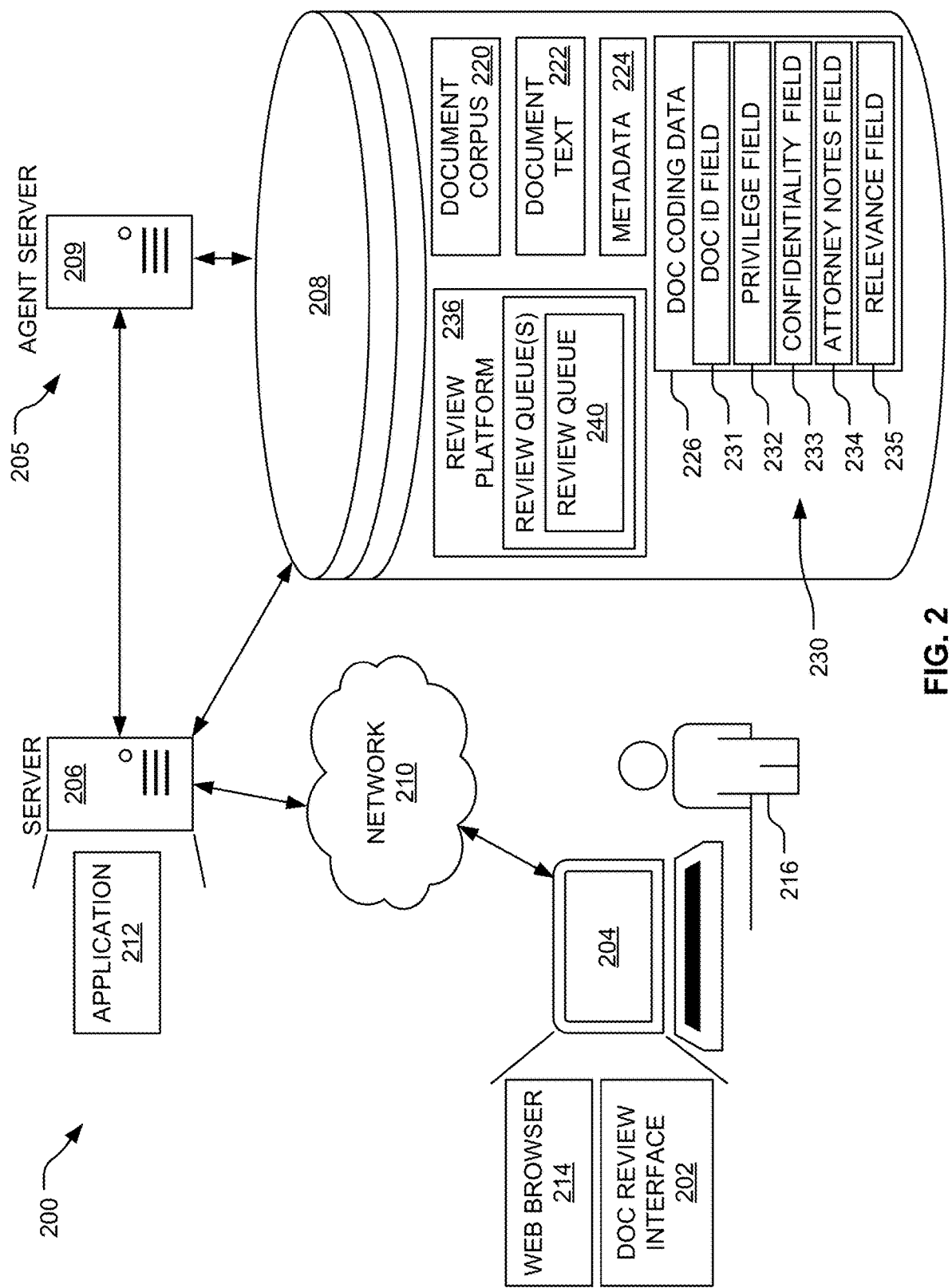
FIG. 2 is a block diagram of a system configured to generate a document review interface.

FIG. 2 illustrates a system 200 configured to generate a document review interface 202, which is displayed to a human user 216 by a client computing device 204. The document review interface 202 may be used to input information for a plurality of documents more quickly than can be done using prior art interfaces (e.g., the coding interface 100 illustrated in FIGS. 1A and 1B). In other words, the document review interface 202 is configured to receive and display document coding for the plurality of documents. Referring to FIG. 2, the document review interface 202 may be used to rapidly implement document coding decisions made by the user 216 with respect to the plurality of documents (e.g., during a legal document review) identified by a review queue 240 associated with the user 216 and stored in a document corpus 220. Optionally, the system 200 may validate the information entered by the user 216 into the document review interface 202.

Figure 19:
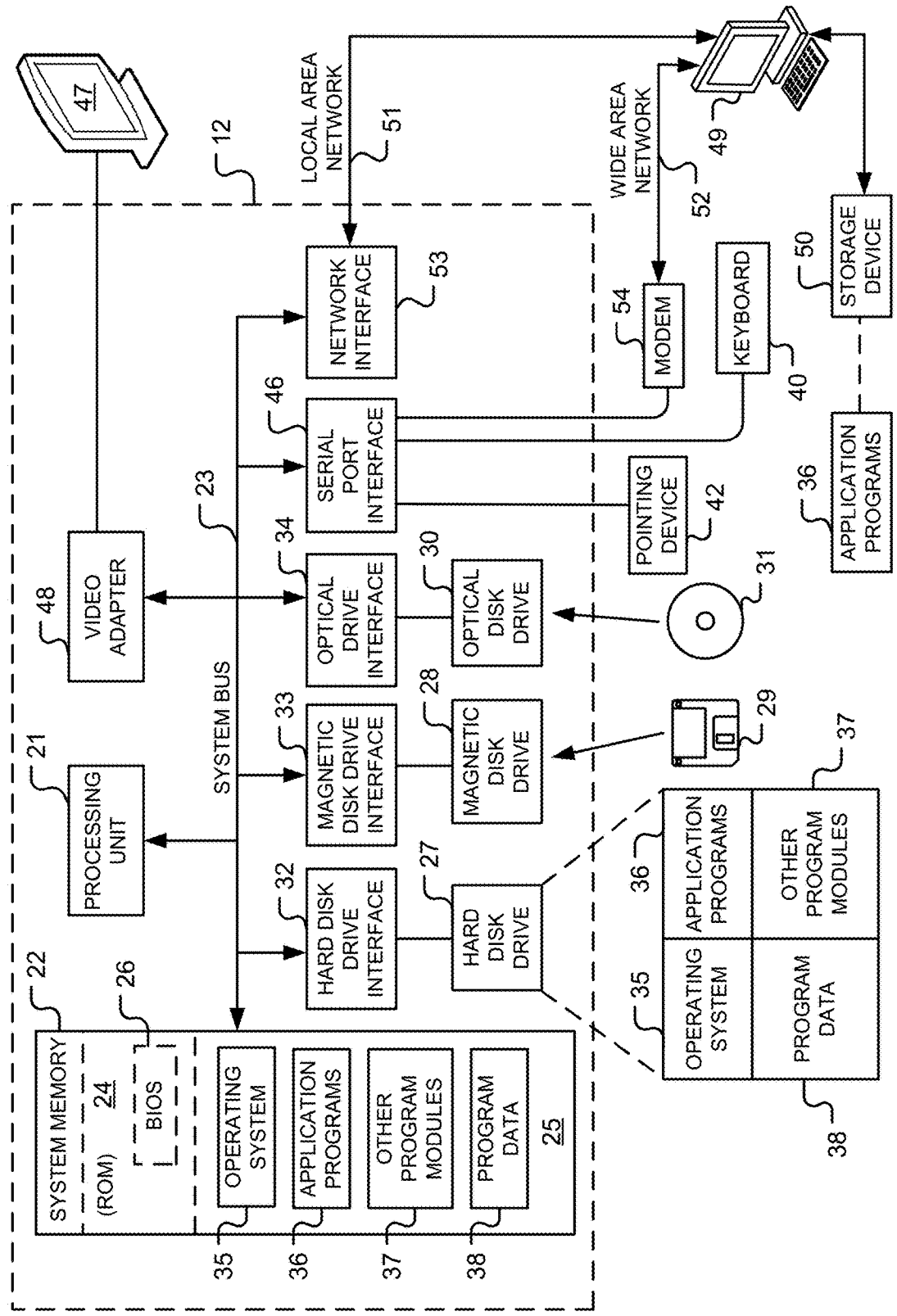
FIG. 19 is a diagram of a hardware environment and an operating environment in which the computing devices of the system of FIG. 2 may be implemented.

For illustrative purposes, the system 200 has been illustrated as including the client computing device 204, a server 206, and a data store 205. The data store 205 has been illustrated and will be described as including a database 208 and an agent computing device 209 but, this is not a requirement and other device and methods for storing data may be used. The system 200 may include more than one client computing device each like the client computing device 204, more than one server each like the server 206, and/or more than one data store each like the data store 205. The data store 205 may include more than one database each like the database 208 and/or more than one agent computing device each like the agent computing device 209. Each of the client computing device 204, the server 206, the database 208, and the agent computing device 209 may be implemented by a computing device 12, which is illustrated in FIG. 19 and described below.

Referring to FIG. 2, the client computing device 204 and the server 206 may be connected to one another by a network 210 (e.g., the Internet). The server 206, the database 208, and the agent computing device 209 are illustrated as being connected directly to one another (e.g., by a Local Area Network) but, this is not a requirement. For example, in alternate embodiments, the client computing device 204, the server 206, the database 208, and the agent computing device 209 may be connected to one another by the network 210.

The client computing device 204 is configured to be operated by the user 216. The client computing device 204 includes a web browser 214 configured to download and display the document review interface 202. The client computing device 204 is also configured to receive information entered by the user 216 into the document review interface 202 and send that information to the server 206.

The server 206 and/or a review platform 236 are configured to implement an application 212. In the embodiment illustrated, the server 206 is implemented as a web server configured to execute the application 212. By way of a non-limiting example, the web server may be implemented using Internet Information Services ("IIS") for Microsoft Windows® Server. In such embodiments, the application 212 may be hosted in IIS. The application 212 is configured obtain information from the database 208, use that information to generate the document review interface 202, and transmit the document review interface 202 to the web browser 214. Thus, the server 206 is configured to communicate with both the database 208 and the web browser 214. The application 212 is configured to cause the web browser 214 to display the document review interface 202 to the user 216. The application 212 is also configured to receive user input (e.g., document coding) entered into the document review interface 202 by the user 216 and transmitted to the server 206 by the client computing device 204. The application 212 is configured to communicate any document coding received via the document review interface 202 to the database 208, which is configured to store the document coding in document coding data 226.

The database 208 executes on a computing device and may be implemented using Microsoft SQL server and/or a similar database program. The database 208 may execute at least in part on the server 206, the agent computing device 209, or another computing device connected to the server 206 (e.g., by the network 210). The database 208 stores the document corpus 220 of electronic documents. For each document in the corpus 220, the database 208 may store extracted document text 222, metadata 224, and the document coding data 226. For each document, the metadata 224 stores parameters or field values extracted from the document or about the document. For each document, the document coding data 226 stores information (e.g., document coding) entered by one or more users (e.g., the user 216). The document coding data 226 may include one or more fields 230 into which the user(s) enter data. By way of a non-limiting example, the field(s) 230 may include a document identifier ("ID") field 231, a privilege field 232, a confidentiality field 233, an attorney notes field 234, a relevance field 235, and the like. Optionally, one or more of the fields 230 may be associated with a predetermined list of valid values from which the user(s) may choose. The database 208 may store the predetermined list(s).

The database 208 and/or the server 206 implement the review platform 236 configured to communicate with the document review interface 202 executing on each of the client computing device(s) (e.g., the client computing device 204). The review platform 236 maintains a review queue for each of the users (e.g., the user 216). In the embodiment illustrated, the review platform 236 maintains the review queue 240 for the user 216. The review queue 240 identifies those of the documents in the corpus 220 that are to be reviewed by the user 216.

During the human review phase, the user 216 uses the document review interface 202 to access the review platform 236. The review platform 236 is configured to retrieve and send one or more of the documents identified in the review queue 240 to the client computing device 204. The document(s) is/are presented to the user 216 via the document review interface 202. The review platform 236 has been described and illustrated as being implemented by the database 208. However, this is not a requirement. Alternatively, at least a portion of the review platform 236 may be implemented by the client computing device 204, the server 206, the agent computing device 209, and/or another computing device. At least a portion of the review platform 236 may be implemented using one or more commercially available products, such as RelativityOne. Thus, the review platform 236 may be implemented at least in part by RelativityOne and used with the document review interface 202, which may be implemented as a web interface generated by the application 212, which is hosted in IIS. In such embodiments, the application 212 may be implemented as a web application. The data used to generate the document review interface 202 and/or the data entered into the document review interface 202 may be stored in the database 208, which may be implemented using Microsoft SQL server. The agent computing device 209 may execute one or more components of the database 208.

In the embodiment illustrated, the application 212 is implemented at least in part by the server 206. In some implementations, the application 212 may be implemented at least in part by the database 208, the agent computing device 209, the client computing device 204, and the like. The application 212 is applied against the corpus 220 of electronic documents stored in the database 208, which is equipped to facilitate document review. After the application 212 is installed on the server 206, the document review interface 202 is available for use by the user 216.

Figure 3:
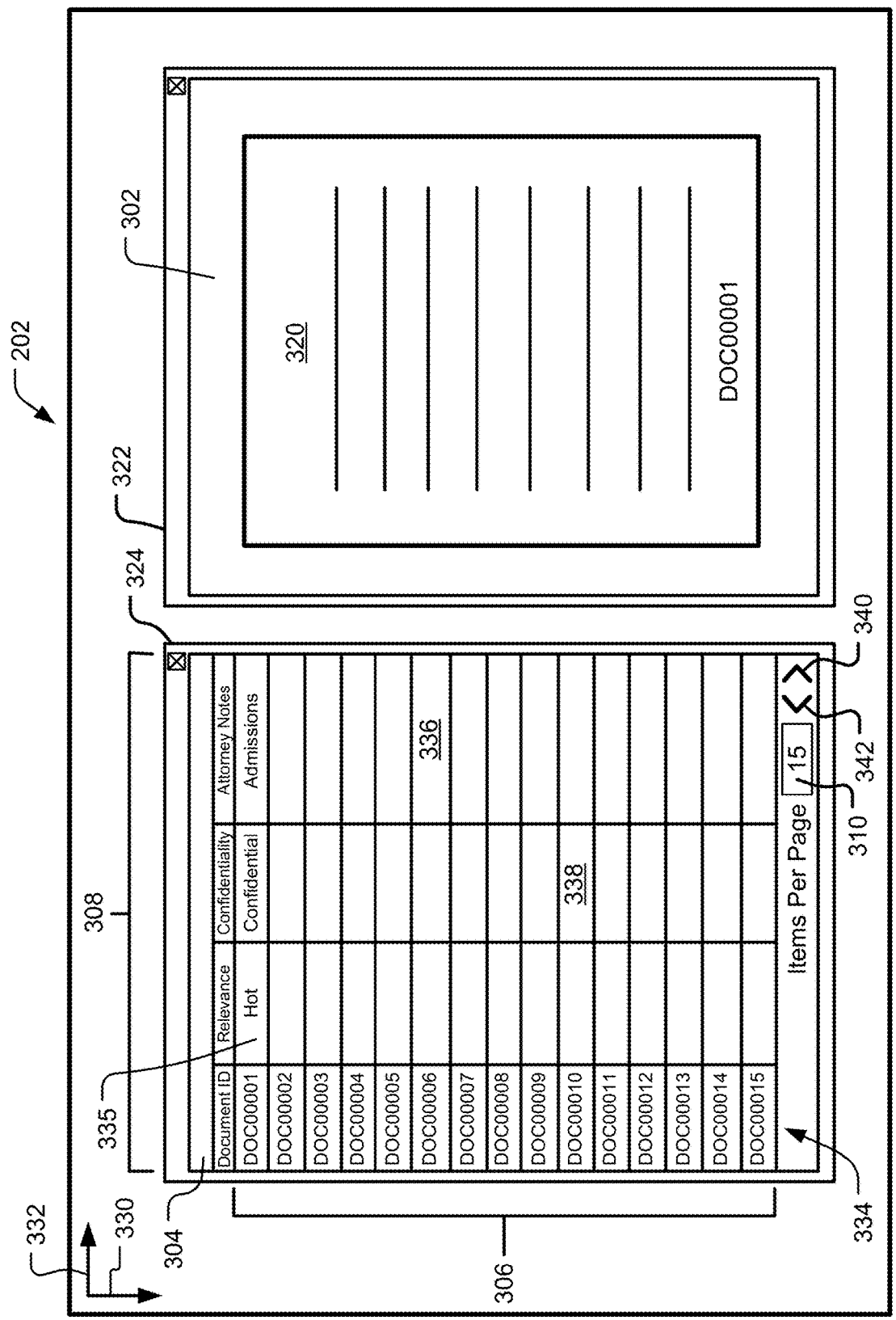
FIG. 3 is an illustration of the document review interface displaying a first document (document "DOC00001") in a document viewer interface and coding information for a plurality of documents (e.g., documents "DOC00001" to "DOC00015") in a grid view coding interface.

Referring to FIG. 3, the document review interface 202 includes a document viewer interface 302 and a grid view coding interface 304. The document viewer interface 302 may be substantially similar to the document viewer 102 (see FIGS. 1A and 1B). The document viewer interface 302 allows the user 216 to view a rendering 320 of a selected document (e.g., the document for which the document ID field 231 stores the value "DOC00001") and to review the contents of the document by viewing the rendering 320. The document viewer interface 302 may render each document in a window 322 that is separate from a window 324 that displays the grid view coding interface 304.

The grid view coding interface 304 is configured to display a plurality of rows 306 each representing a different document and a plurality of columns 308 each representing a different one of the fields 230 (see FIG. 2). In the example illustrated, the grid view coding interface 304 includes four columns and 15 rows. Referring to FIG. 2, each of the 15 rows represents a different document in the review queue 240 of the user 216. In the example illustrated in FIG. 3, the documents having values "DOC00001" to "DOC00015" in the document ID field 231 (see FIG. 2) are represented by the plurality of rows 306 of the grid view coding interface 304. In FIG. 3, the plurality of columns 308 include columns labeled "Document ID," "Relevance," "Confidentiality," and "Attorney Notes" that represent the document ID field 231, the relevance field 235, the confidentiality field 233, and the attorney notes field 234, respectively. The grid view coding interface 304 may be resized or scrolled to the left or right to reveal additional columns (e.g., a column labeled "Privilege" for the privilege field 232).

The plurality of rows 306 are arranged or stacked along a Y-axis 330 and the plurality of columns 308 are arranged side-by-side along an X-axis 332. Together the X-axis 332 and the Y-axis 330 form an array 334 of cells. In other words, for each unique intersection of one of the rows and one of the columns, the grid view coding interface 304 includes a cell within the array 334 that displays a value of the field represented by the column of the intersection for the document represented by the row of the intersection. For example, a cell 335 displays a value "Hot" of the relevance field 235 (see FIG. 2) for the first document displayed, which is the document that has the value "DOC0001" in the document ID field 231 (see FIG. 2). Thus, the grid view coding interface 304 may be characterized as including cells that are displayed in tabular format, similar to an electronic spreadsheet.

Figure 8:
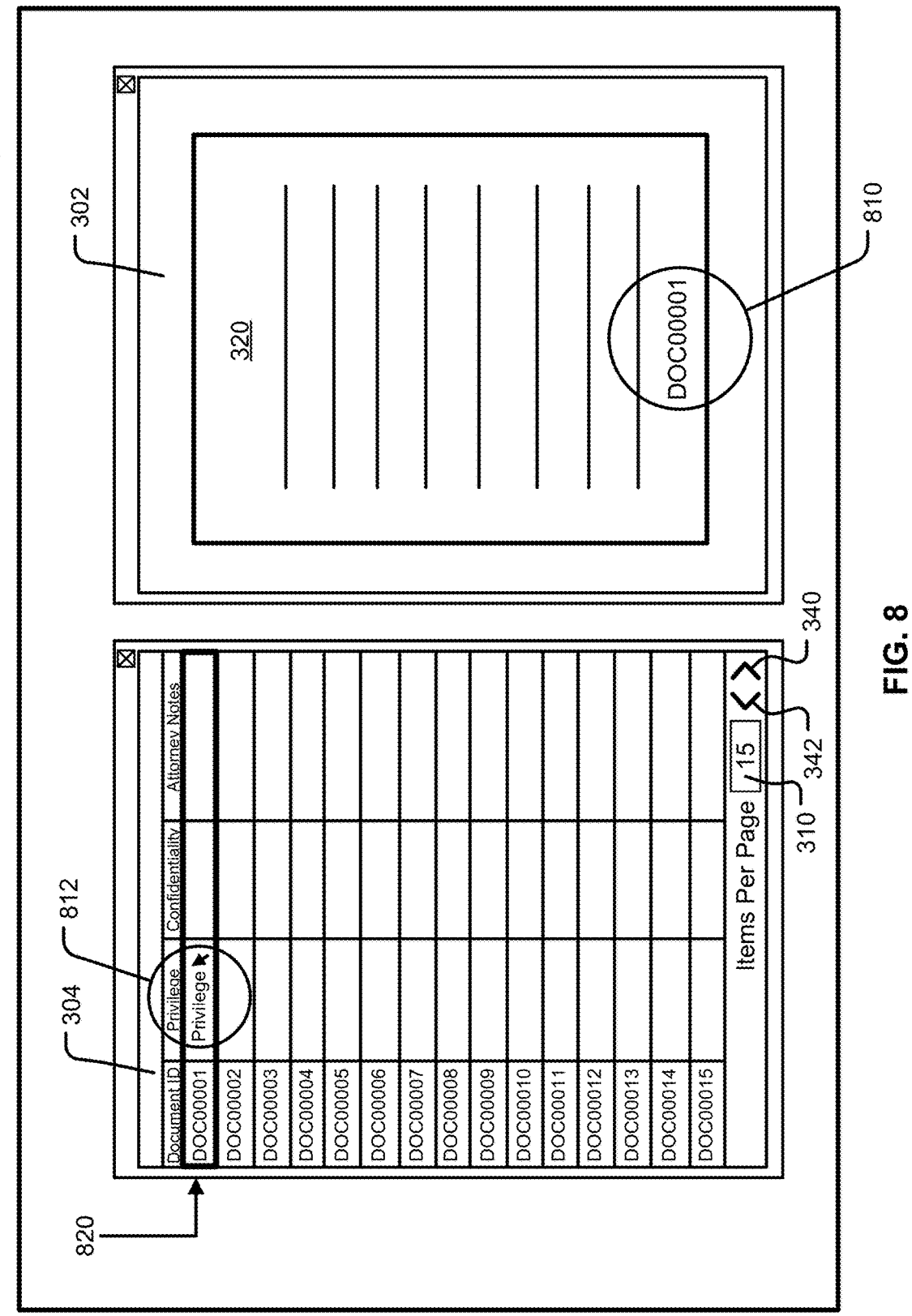
FIG. 8 is an illustration of a first cell being selected in the grid view coding interface and a first rendering of the document (document "DOC0001") represented by the row of the selected first cell being automatically displayed in the document viewer interface.
Figure 9:
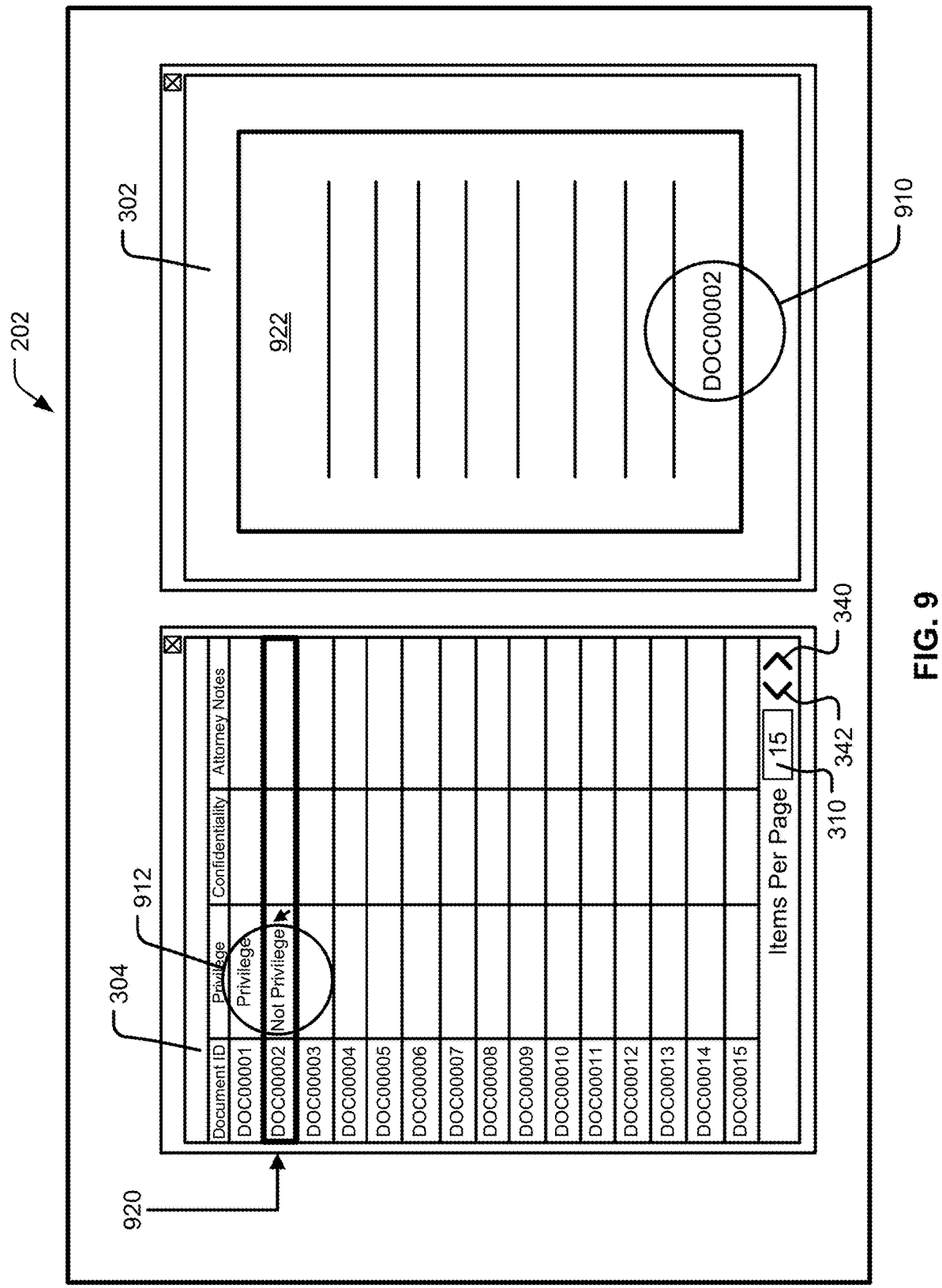
FIG. 9 is an illustration of a second cell being selected in the grid view coding interface and a second rendering of the document (document "DOC0002") represented by the row of the selected second cell being automatically displayed in the document viewer interface.

The user 216 may select one of the documents represented by the plurality of rows 306 by placing focus on (e.g., clicking on) the row representing the selected document. Referring to FIG. 8, the document viewer interface 302 is configured to actively and automatically synchronize with the grid view coding interface 304, so that when the user 216 places focus on a particular cell 812 within a particular row 820 (e.g., using a mouse or keystroke), the document corresponding to the particular row 820 will be rendered within the document viewer interface 302. Thus, the user 216 (see FIGS. 2, 10B, and 10C) may quickly select and display different documents. For example, referring to FIG. 9, when the user 216 moves the focus to a second row 920 (e.g., using a mouse or keystroke), the corresponding document will be rendered within the document viewer interface 302. In this example, the focus is moved to a cell 912 in the second row 920, which corresponds to the document that has the value "DOC0002" in the document ID field 231 (see FIG. 2). After this occurs, the document viewer interface 302 renders this document (as a rendering 922) and displays the rendering 922 to the user 216. Thus, when the user 216 advances to a next document in the grid view coding interface 304, the document viewer interface 302 automatically renders the next document and displays the rendering 922 of the next document to the user 216. In the document viewer interface 302, the value ("DOC0002") of the document ID field 231 (see FIG. 2) of the next document is identified by a circle 910.

Referring to FIG. 3, the user 216 (see FIGS. 2, 10B, and 10C) enters information (e.g., document coding) into the database 208 by entering the information directly into the array 334 of cells in the grid view coding interface 304. As explained above, the user 216 may select one of the documents represented by the plurality of rows 306 by placing focus on (e.g., clicking on) the row representing to the document. Similarly, the user 216 may select one of the fields 230 by selecting one of the cells within the column representing the field. For example, the user 216 may select a cell 336 when the user 216 wishes to enter information into the attorney notes field 234 (see FIG. 2) for the document having the value "DOC00006" in the document ID field 231 (see FIG. 2). Similarly, the user 216 may select a cell 338 when the user 216 wishes to enter information into the confidentiality field 233 (see FIG. 2) for the document having the value "DOC00010" in the document ID field 231 (see FIG. 2).

The document review interface 202 may limit how many rows the grid view coding interface 304 will display. For example, the grid view coding interface 304 may be characterized as displaying a page that includes a predetermined number of rows with each row representing a different document. The user 216 may change the particular documents represented by the rows by selecting a different page.

The document review interface 202 may have some user-defined settings. For example, the document review interface 202 may include a user input 310 (e.g., a text box) that allows the user 216 to input a numerical value (e.g., 15) that instructs the document review interface 202 how many rows to display in the grid view coding interface 304 per page. In other words, the numerical value of the user input 310 instructs the document review interface 202 how many rows to display in the grid view coding interface 304 per page. For example, if the user 216 uses the user input 310 to enter or select the value "15," the grid view coding interface 304 will initially display 15 rows, corresponding to the first 15 documents in the review queue 240 (see FIG. 2) of the user 216. After the user 216 completes the first 15 documents, the user 216 may navigate to the next set of 15 documents, and so on.

Figure 17A:
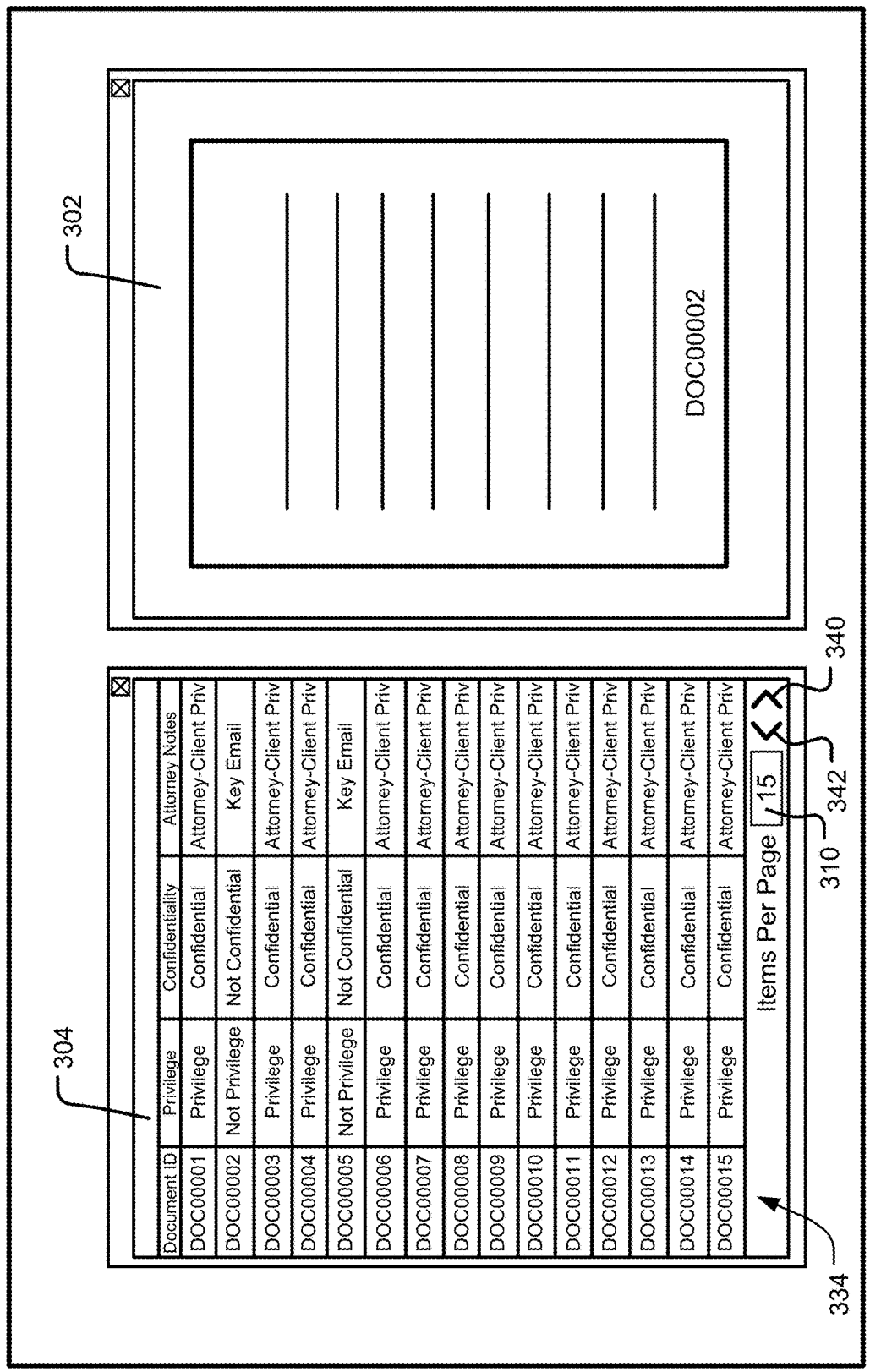
FIG. 17A is an illustration of a first page of the grid view coding interface.
Figure 17B:
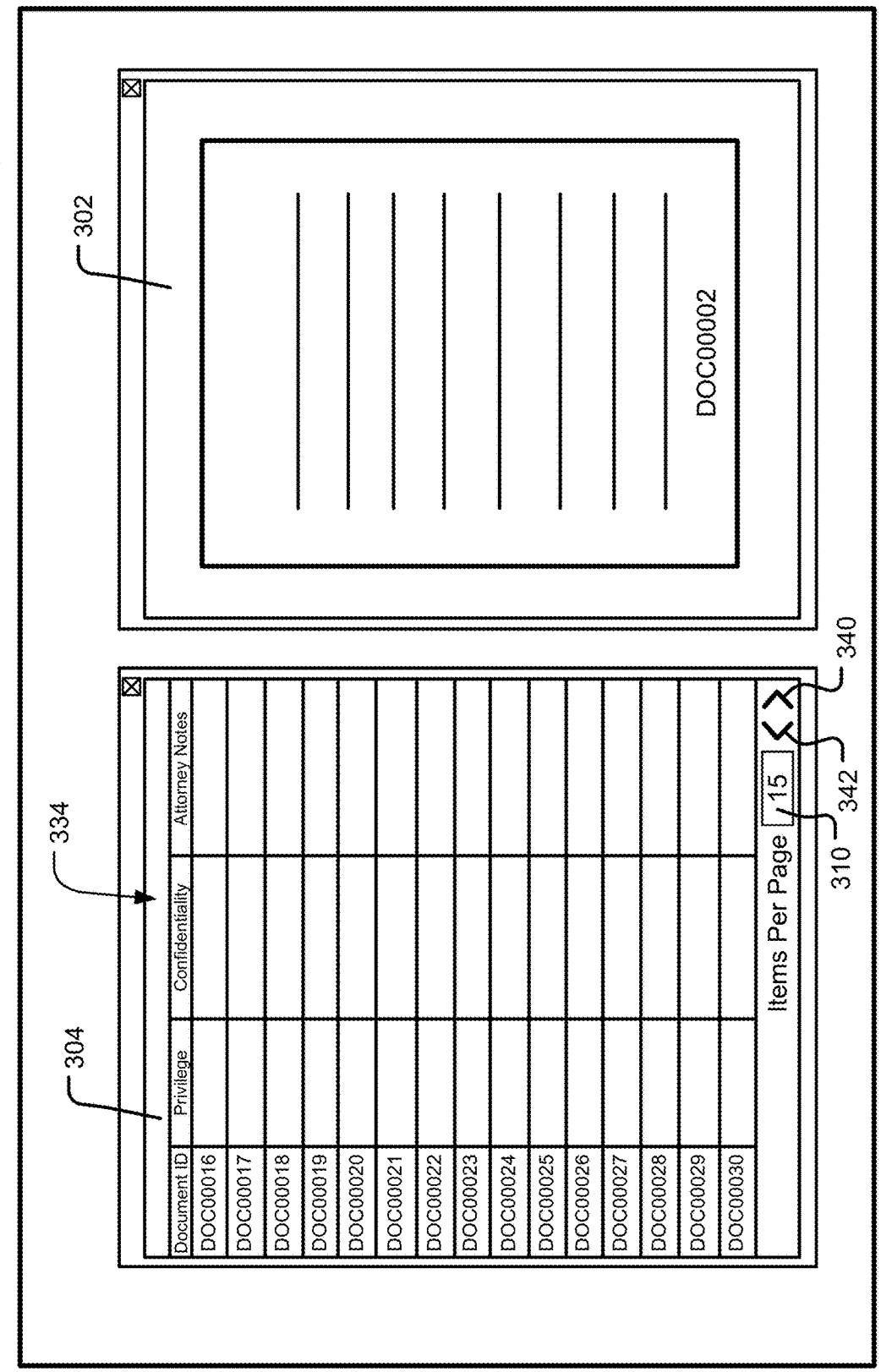
FIG. 17B is an illustration of a second page of the grid view coding interface.

The grid view coding interface 304 may include a next page user input 340 that, when selected, will cause the grid view coding interface 304 to display the next set of 15 documents. In the embodiment illustrated, the next page user input 340 has been implemented as a "Next Page" icon that the user 216 clicks on to navigate to the next page, which displays a next set of documents (e.g., documents 16-30). Thus, the user 216 may code each of the next set of documents. For example, FIG. 17A shows the grid view coding interface 304 after the array 334 of cells have been coded by the user 216 for the document having the values "DOC0001" to "D000015" in the document ID field 231 (see FIG. 2). FIG. 17B shows the grid view coding interface 304 after the user 216 has selected the next page user input 340 in FIG. 17A. In FIG. 17B, the grid view coding interface 304 displays rows for the documents having the values "D000015" to "D000030" in the document ID field 231 (see FIG. 2). Optionally, the grid view coding interface 304 may include may include a previous page user input 342 that, when selected, will cause the grid view coding interface 304 to display the previous set of documents. In the embodiment illustrated, the previous page user input 342 has been implemented as a "Previous Page" icon that the user 216 may click on to navigate to the previous page, which displays a previous set of documents. For example, FIG. 17A shows the grid view coding interface 304 after the user 216 has selected the previous page user input 342 in FIG. 17B. Thus, by using the next and previous page user inputs 340 and 342, the user 216 may navigate through the documents one page at a time.

Referring to FIG. 3, while the plurality of rows 306 have and will be described and illustrated as representing a set of documents and the plurality of columns 308 have and will be described and illustrated as representing at least some of the fields 230 (see FIG. 2), in alternate embodiments, the plurality of rows 306 may represent at least some of the fields 230 and the plurality of columns 308 may represent the set of documents. In such embodiments, the numerical value (e.g., 15) entered into the user input 310 (e.g., a text box) may instructs the document review interface 202 how many columns to display in the grid view coding interface 304 per page.

Figure 10A:
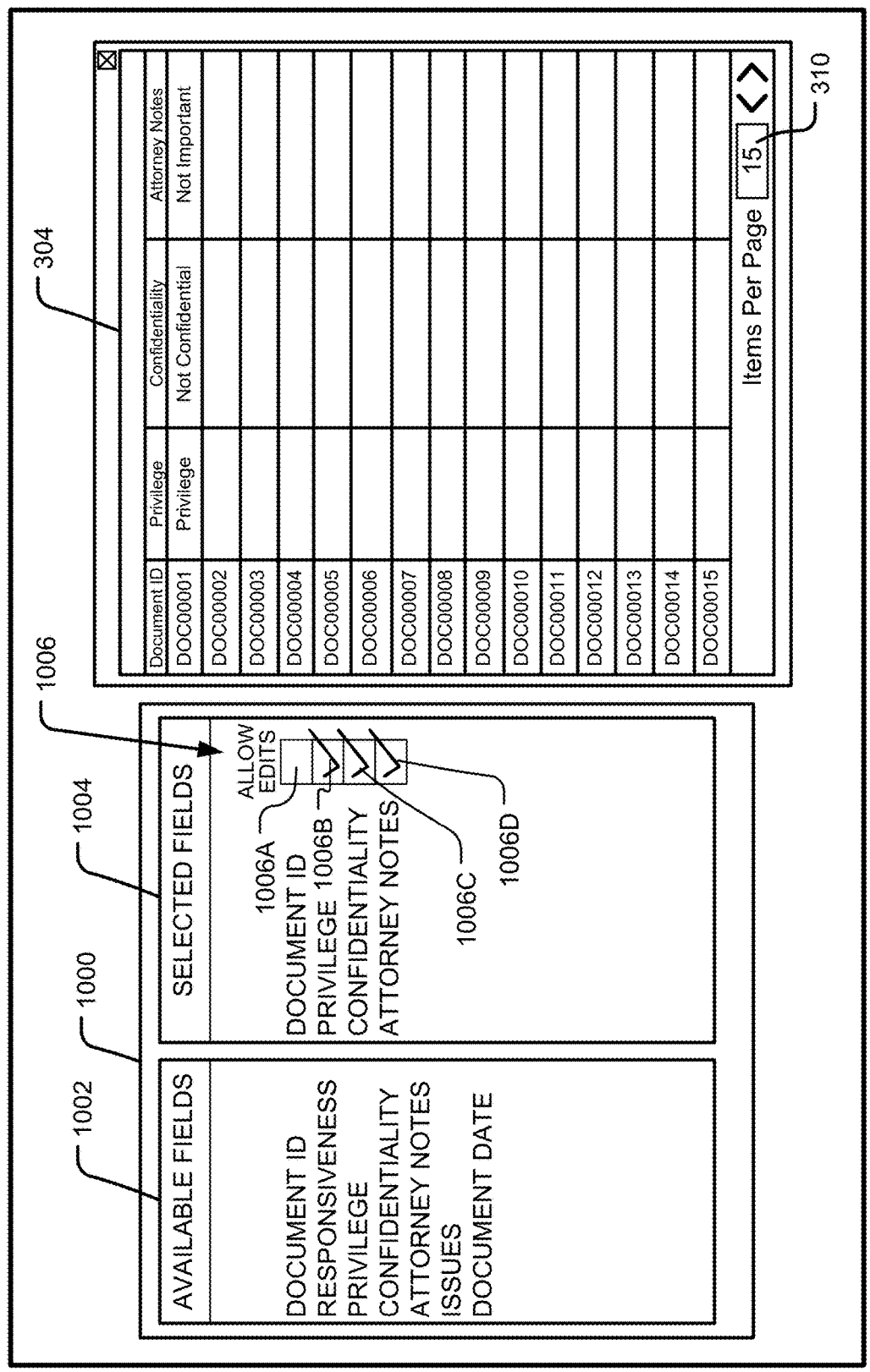
FIG. 10A is an illustration of a field selection interface depicted alongside the grid view coding interface.

By way of another non-limiting example, the user-defined settings may include one or more field settings. Referring to FIG. 2, after installing the application 212, the user 216 determines which of the fields 230 the user 216 would like to include in the document review interface 202. Referring to FIG. 10A, the document review interface 202 may be configured to display a field selection interface 1000. The user 216 may use the field selection interface 1000 to select one or more of the fields 230 (see FIG. 2) that the user 216 would like included in the grid view coding interface 304. The field selection interface 1000 may include a list 1002 of available database fields from which the user 216 can select the fields to be displayed by the grid view coding interface 304. The field selection interface 1000 may include a list 1004 of the field(s) selected by the user 216. Next to the selected field(s), the list 1004 may include user input(s) 1006 that allow the user 216 to select which of the selected field(s) is editable. For example, the user input(s) 1006 illustrated include user inputs 1006A-1006D, which, referring to FIG. 2, correspond to the document ID field 231, the privilege field 232, the confidentiality field 233, and the attorney notes field 234, respectively. Thus, referring to FIG. 10A, each selected field in the list 1004 can be an editable field or a reference only (or read-only) field. For example, an email's "Sent Date" may be a useful reference point for an email review and may be included as an un-editable reference-only field. On the other hand, the user 216 may choose to include the relevance field 235 (see FIG. 2) as an editable field, which will be used to assign a relevance value to each document in the review queue 240 (see FIG. 2) of the user 216. In FIG. 10A, the user 216 has selected the privilege field 232, the confidentiality field 233, and the attorney notes field 234 as editable fields by selecting (e.g., clicking on or checking) the user inputs 1006B-1006D, respectively. In FIG. 10A, the grid view coding interface 304 is illustrated in a right-hand portion of the document review interface 202 after having been configured by the field setting(s) selected by the user 216.

Figure 10B:
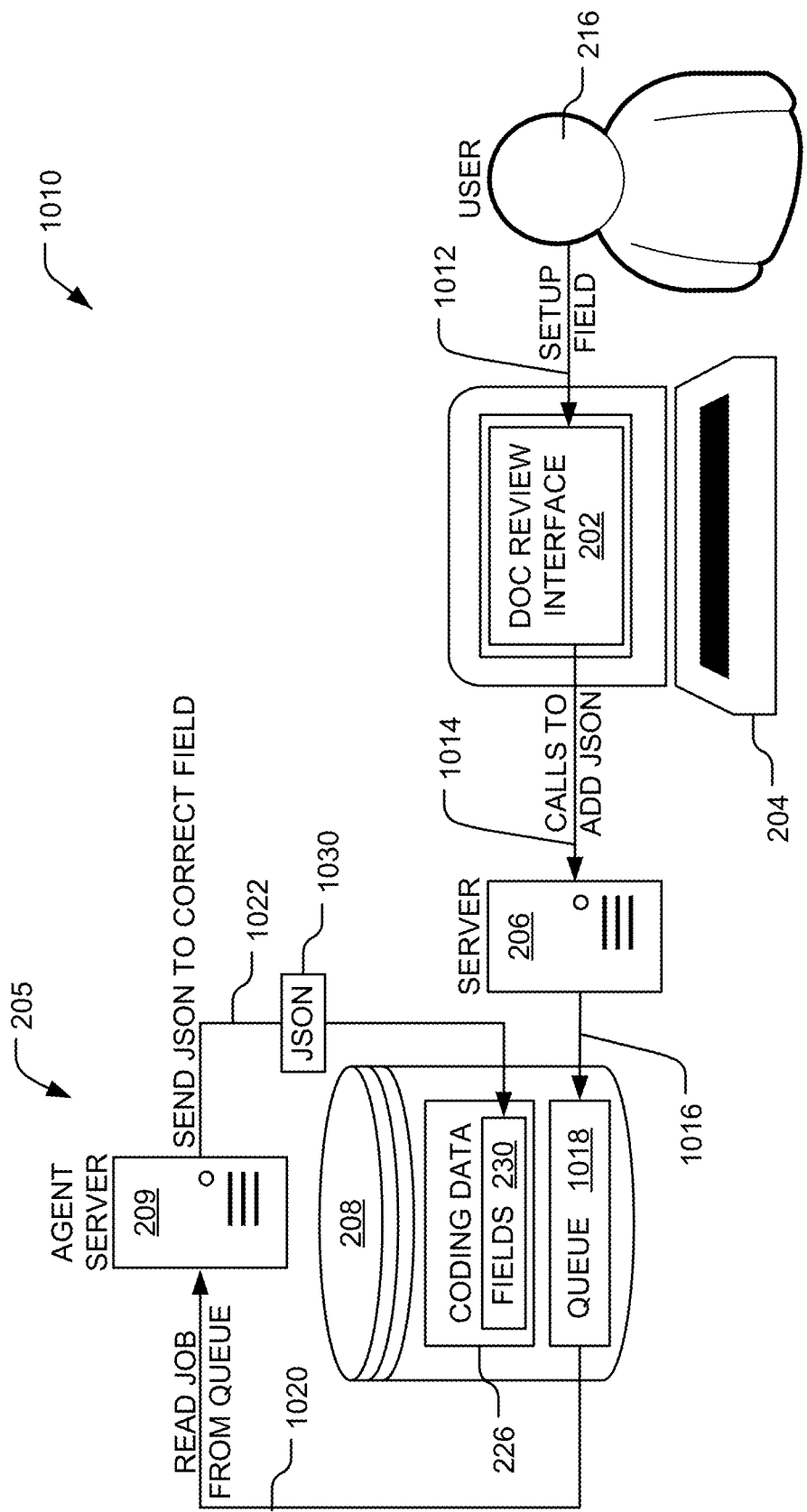
FIG. 10B is a block diagram of a data flow through the system of FIG. 2 when the system is implementing field staging.

FIG. 10B is a block diagram of a data flow 1010 through the system 200 (see FIG. 2) when the system 200 is implementing field staging. First, the user 216 selects (identified by an arrow 1012) one of the fields 230 (see FIG. 2) that the user 216 wishes to make editable. For example, referring to FIG. 10A, the user 216 (see FIGS. 2, 10B, and 10C) may select a field from the list 1002 of available fields, which will add the selected field to the list 1004. Then, the user 216 may use one of the user input(s) 1006 corresponding to the selected field to indicate that the user 216 would like the selected field to be editable.

Returning to FIG. 10B, the document review interface 202 may send a call or a request (identified by an arrow 1014) to the server 206 to add a configuration object 1030 (e.g., having JavaScript Object Notation ("JSON") format) to the selected field that the user 216 wishes to make editable. The server 206 sends (identified by an arrow 1016) the request to the database 208, which stores the request as a job in a queue 1018. The agent computing device 209 reads (identified by an arrow 1020) the job from the queue 1018.

Then, the agent computing device 209 creates the configuration object 1030 and sends (identified by an arrow 1022) the configuration object 1030 to the database 208 for storage and use thereby. The configuration object 1030 describes or identifies a field type of the selected field and includes any options for the selected field (e.g., a list of valid field values). The database 208 may include a configuration field associated with the selected field and may store the configuration object 1030 or contents of the configuration object 1030 in the configuration field. For example, the database 208 may store the configuration object 1030 as the value of the configuration field. In such embodiments, the configuration object 1030 may include the document coding entered by the user 216 for the selected field for the documents. For example, after the user 216 enters a coding value for the selected field, the coding value may be written to the selected field in the database 208, and into the associated configuration field, along with the contents of the configuration object 1030. This allows the grid view coding interface 304 to display, when the user 216 logs in to the review platform 236, work product that the user 216 completed before the user 216 logged out previously. This also allows multiple users to view already coded values when they load the grid view coding interface 304 for the same documents.

When the application 212 (see FIG. 2) generates the document review interface 202, the application 212 renders the contents of the configuration object(s) for the editable field(s) in the list 1004 (see FIG. 10A) and uses this rendered information to generate the grid view coding interface 304. As mentioned above, the contents of each of the configuration object(s) may be stored in a configuration field associated with the editable field. The application 212 (see FIG. 2) may use hidden styling so the configuration object(s) is/are not visible on the document review interface 202.

Figure 10C:
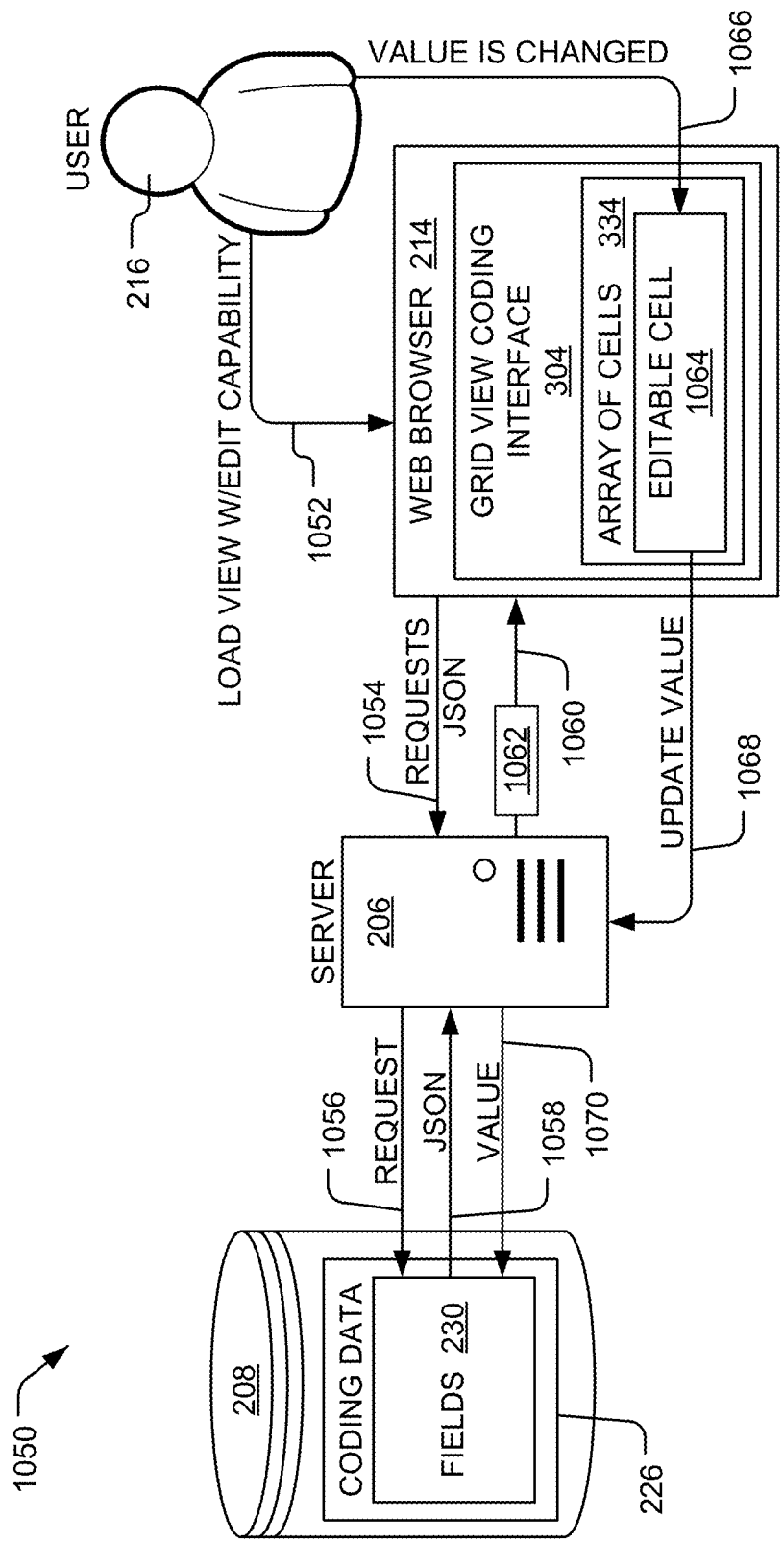
FIG. 10C is a block diagram of a data flow through the system of FIG. 2 when the system is implementing code interactions.

FIG. 10C is a diagram of a data flow 1050 through the system 200 (see FIG. 2) when the system 200 is implementing code interactions. First, the user 216 indicates (identified by an arrow 1052) to the web browser 214 that the user 216 would like to load the grid view coding interface 304. The web browser 214 transmits (identified by an arrow 1054) this indication to the server 206 and requests the configuration object (e.g., having the JSON format) for each of the editable field(s) to be displayed in the grid view coding interface 304. The server 206 sends (identified by an arrow 1056) requests for the configuration object(s) from the database 208. In other words, the server 206 may query the database 208 for information that the server 206 needs to generate the grid view coding interface 304. In response, the database 208 sends (identified by an arrow 1058) the query results to the server 206. The query results include the configuration object(s). Next, the server 206 generates the grid view coding interface 304 and sends (identified by an arrow 1060) the configuration object(s) to the web browser 214 along with the grid view coding interface 304. When the server 206 generates the grid view coding interface 304, an interaction event handler (e.g., a Relativity Page interaction event handler) is triggered on the server 206 that deploys computer-executable code 1062 (e.g., custom Javascript) with the grid view coding interface 304.

When the grid view coding interface 304 is loaded by the web browser 214, the client computing device 204 executes the computer-executable code 1062 within the web browser 214. The computer-executable code 1062 reads the contents of the configuration object(s) and uses this information to determine the display type (e.g., editable or non-editable) for each cell in the array 334 of cells. For example, the computer-executable code 1062 may parse the configuration object(s) and use the information parsed from the configuration object(s) to determine the display type (e.g., editable or non-editable) for each cell in the array 334 of cells. The web browser 214 renders the relevant components (e.g., the array 334 of cells) of the grid view coding interface 304 and displays the grid view coding interface 304 to the user 216. In FIG. 10C, the array 334 of cells include an editable cell 1064 for receiving a value of a corresponding field for a corresponding document.

The user 216 may edit (identified by an arrow 1066) the editable cell 1064. After the user 216 finishes editing the editable cell 1064, the web browser 214 sends (identified by an arrow 1068) an updated value to the server 206. The server 206 forwards (identified by an arrow 1070) the updated value to the database 208. The database 208 receives the updated value and stored it in the coding data 226 within the corresponding field for the corresponding document. As mentioned above, the updated value may be stored in the configuration object for the corresponding field.

The components (e.g., the array 334 of cells) may be associated with listed events that detect when the user 216 has entered and/or exited the component. For example, when the user 216 enters or changes the data within the editable cell 1064 and then exits the editable cell 1064, a call (e.g., a REST call) may be made to the application 212 (e.g., to an Application Programming Interface ("API") of the application 212) instructing the application 212 to save the new value in the database 208.

Figure 7:
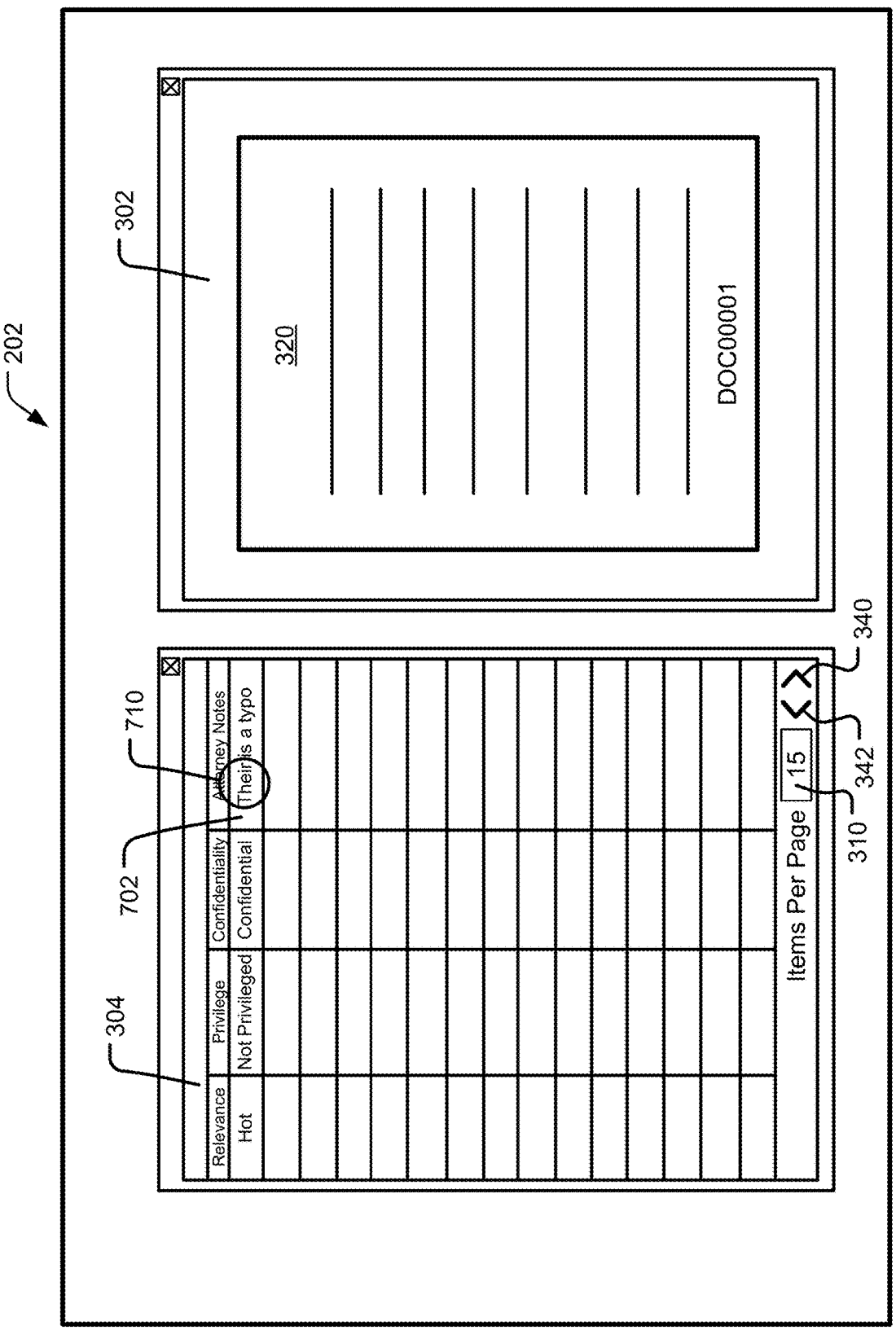
FIG. 7 is an illustration of a typographical error in a cell of the grid view coding interface.
Figure 11:
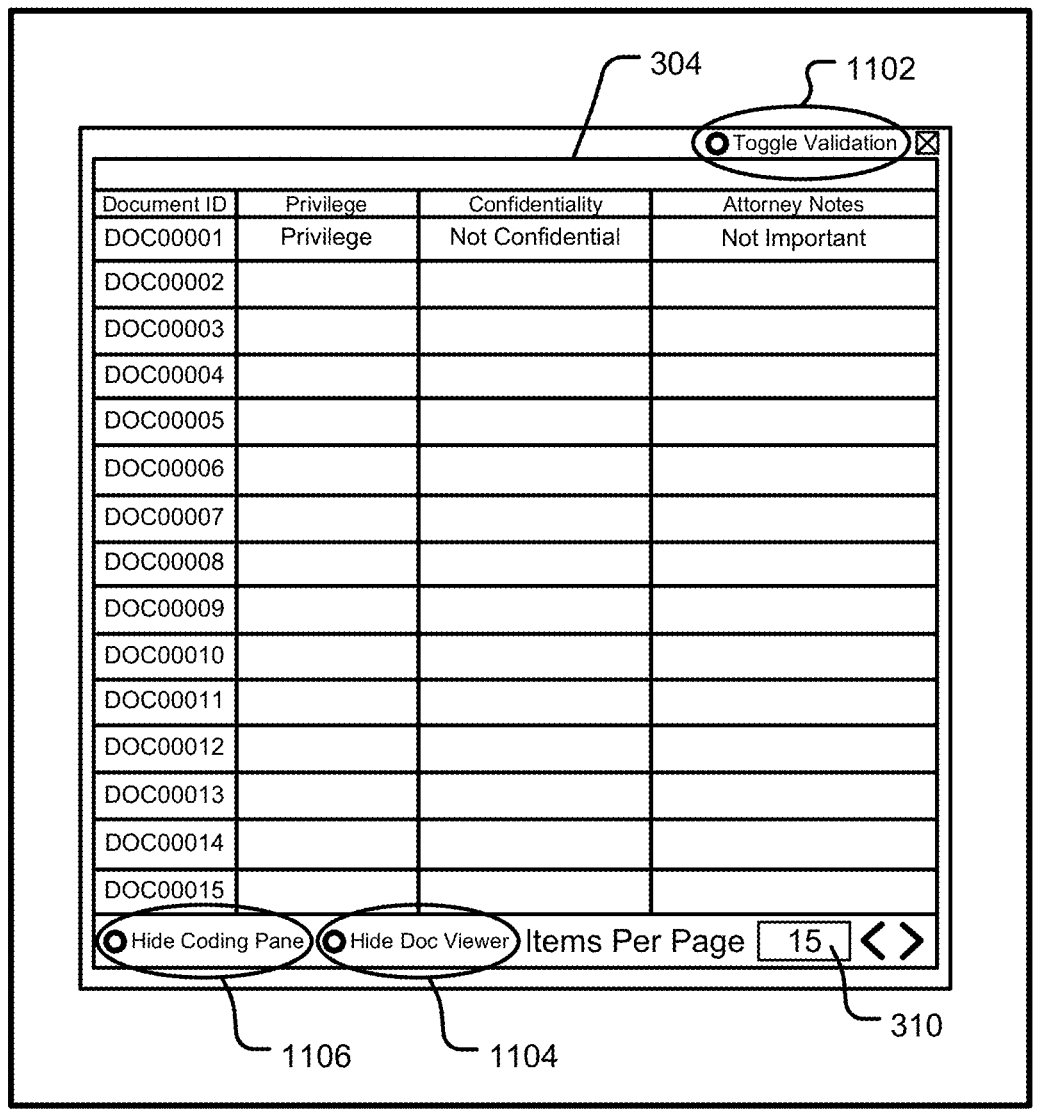
FIG. 11 is an illustration an embodiment of the grid view coding interface that includes a validation user input, a hide document viewer user input, and a hide coding pane user input.

By way of another non-limiting example, referring to FIG. 11, the user-defined settings may include a validation user input 1102 (e.g., a toggle button) that allows the user 216 to selectively enable or disable data entry validation. Referring to FIG. 7, when data entry validation is enabled (or is "on"), the document review interface 202 and/or the application 212 (see FIG. 2) may identify user errors, such as a typographical error in a cell 702 that is identified by a circle 710. Specifically, the circle 710 identifies the erroneous term "Their" that was entered instead of the correct term "There." The document review interface 202 and/or the application 212 (see FIG. 2) may be configured to provide the data entry validation in real-time. When the user 216 enters information into a cell (e.g., the cell 702), the document review interface 202 and/or the application 212 (see FIG. 2) may validate that information against a set of pre-defined document coding rules (e.g., stored in the configuration object associated with the field). An example validation workflow may progress as follows:

1. The user 216 may enter data (e.g., "Their is a typo") into the cell 702 of the grid view coding interface 304;
2. The document review interface 202 and/or the application 212 (see FIG. 2) compares the user-entered data against a set of pre-defined parameters or document coding rules for the cell type and/or the type of the field of the cell;
3. The grid view coding interface 304 indicates (e.g., the cell border is highlighted in green for one second) when the validation is successful; and
4. The grid view coding interface 304 indicates (e.g., the cell border is highlighted in red) when the validation is unsuccessful, until the user 216 corrects the issue.

Referring to FIG. 11, optionally, the user-defined settings may include a hide document viewer user input 1104 that allows the user 216 to selectively show or hide the document viewer interface 302 (see FIGS. 3-9 and 12-17B). Optionally, the user-defined settings may include a hide coding pane user input 1106 that allows the user 216 to selectively show or hide the traditional document coding form 104 (see FIGS. 1A and 1B).

Figure 12:
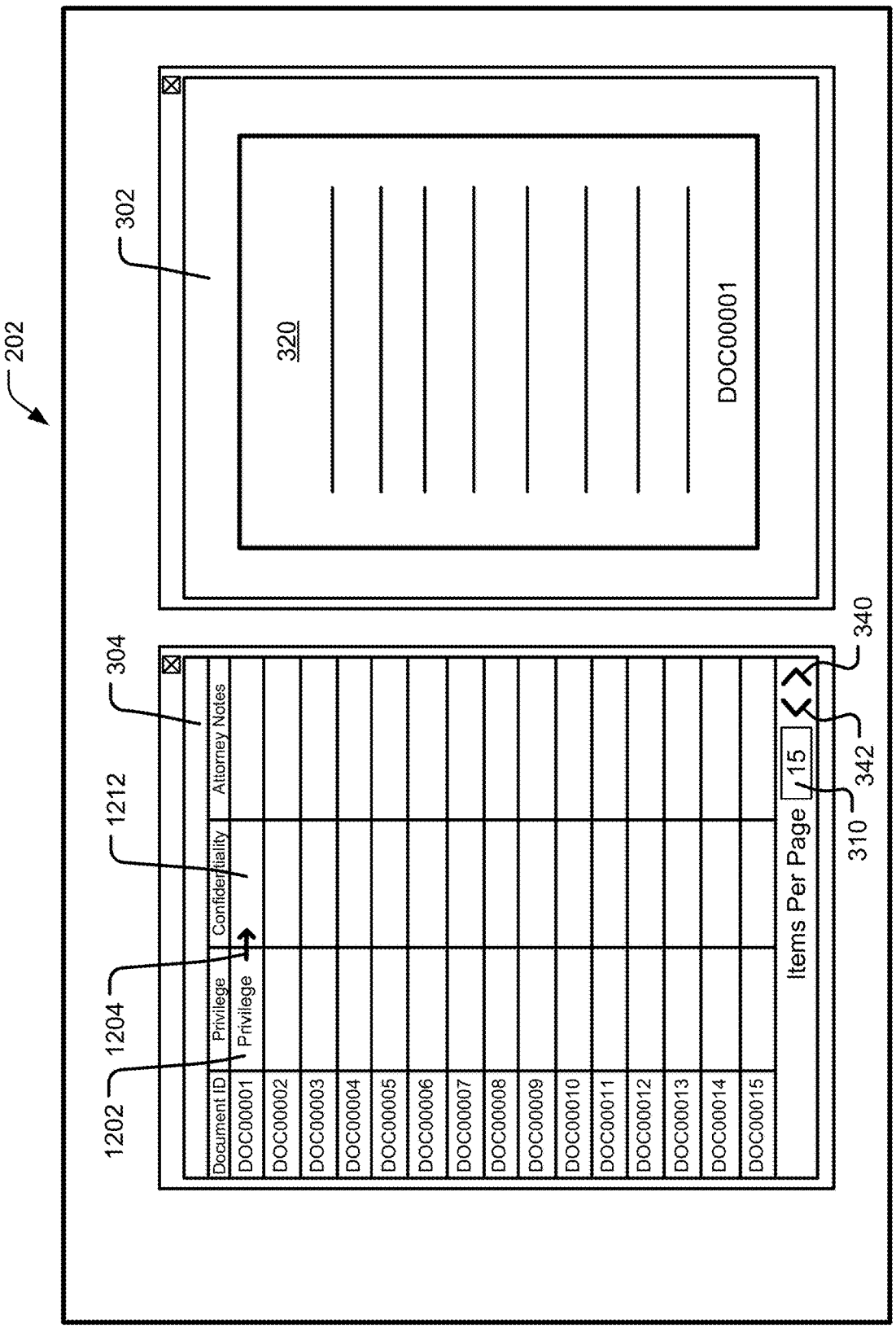
FIG. 12 is an illustration of a Tab key being used to move focus from a first cell to a second cell within the same row of the grid view coding interface.
Figure 13:
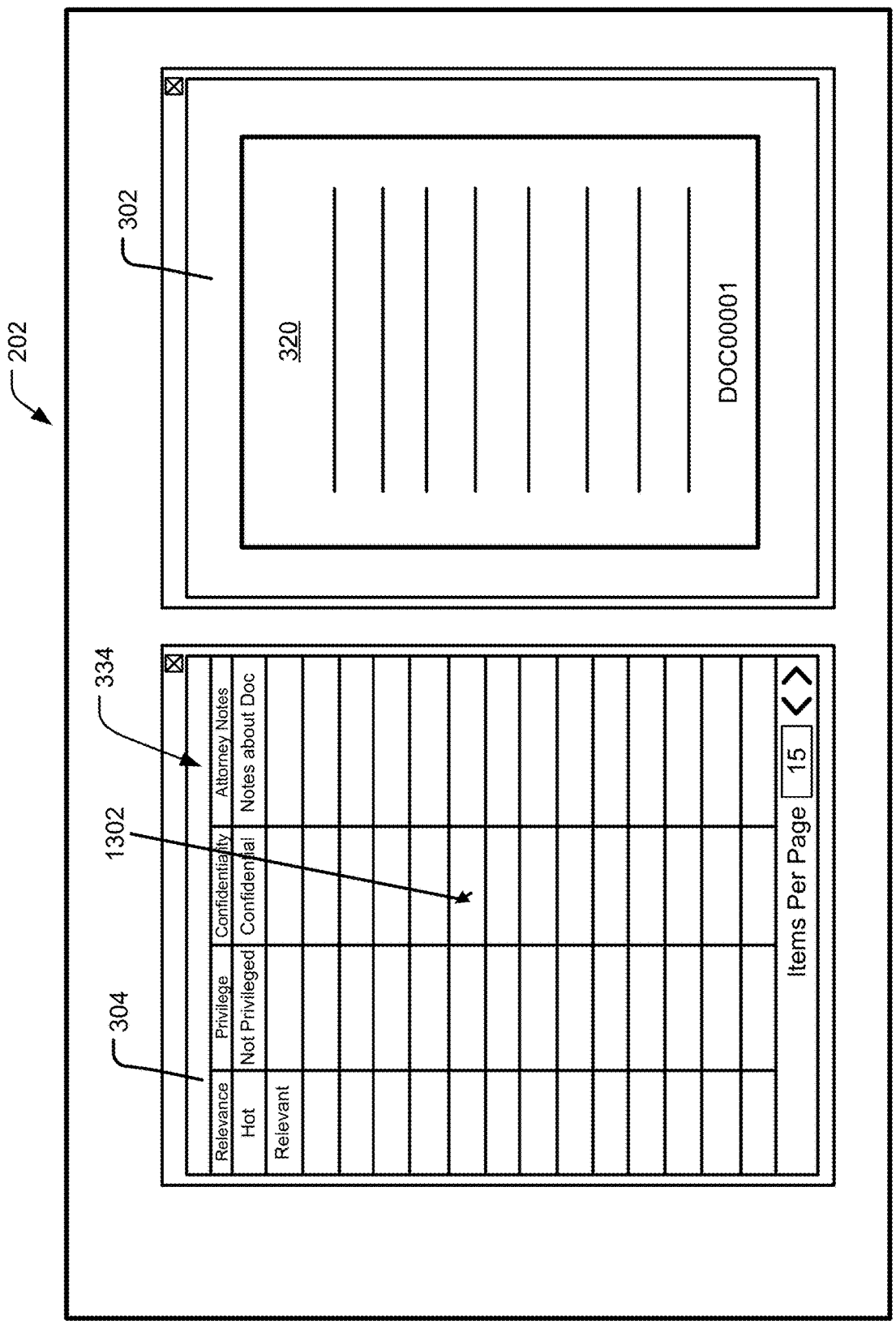
FIG. 13 is an illustration of a pointing device being used to move focus to a selected cell within the grid view coding interface.
Figure 14:
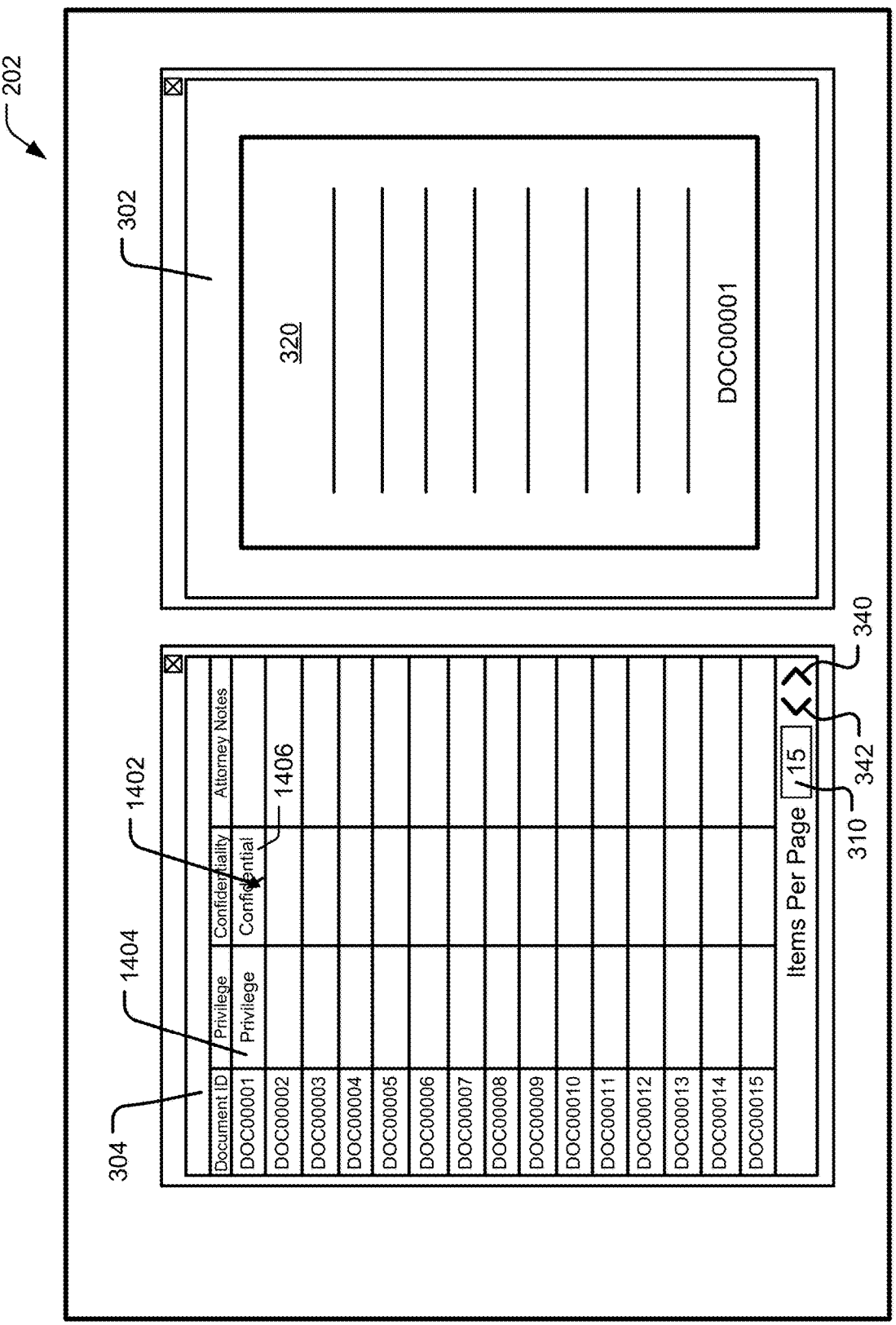
FIG. 14 is an illustration of the pointing device being used to move the focus from the first cell to the second cell within the same row of the grid view coding interface.

Referring to FIG. 12, the user 216 has multiple options for navigational commands within the grid view coding interface 304. In an example configuration, commands may be entered using a keyboard (e.g., a keyboard 40 illustrated in FIG. 19) and/or a mouse (e.g., a pointing device 42 illustrated in FIG. 19). For example in FIG. 12, the focus is on a current cell 1202 of the grid view coding interface 304. When the user 216 uses the keyboard to actuate a tab key (via a keystroke), the focus moves one cell to right of the current cell 1202. In other words, the focus moves in a direction identified by an arrow 1204 to another cell 1212. By way of another non-limiting example, referring to FIG. 13, the user 216 may use the mouse or a trackpad to navigate a cursor 1302 within the grid view coding interface 304. The cursor 1302 may be used to initiate focus in any cell within the grid view coding interface 304. In addition, the mouse or trackpad may be used to enter coding within each cell of the array 334. For example, the mouse may be used to select a choice from a pull-down menu (not shown). FIG. 14 illustrates a cursor 1402 being used to move the focus from a cell 1404 to a cell 1406.

Figure 15:
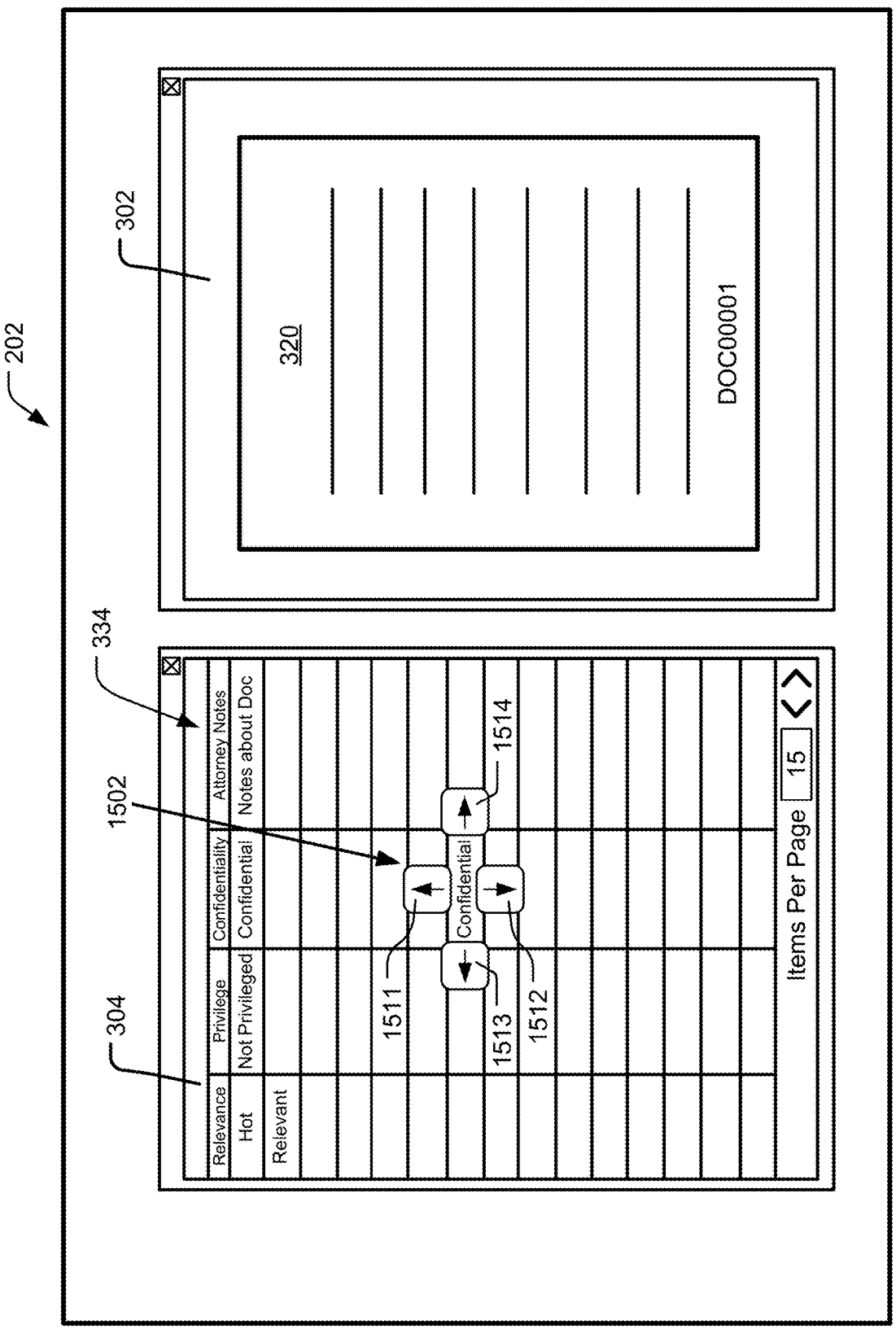
FIG. 15 is an illustration of arrow keys superimposed over the grid view coding interface to show that the arrow keys may be used to select cells within the grid view coding interface.
Figure 16:
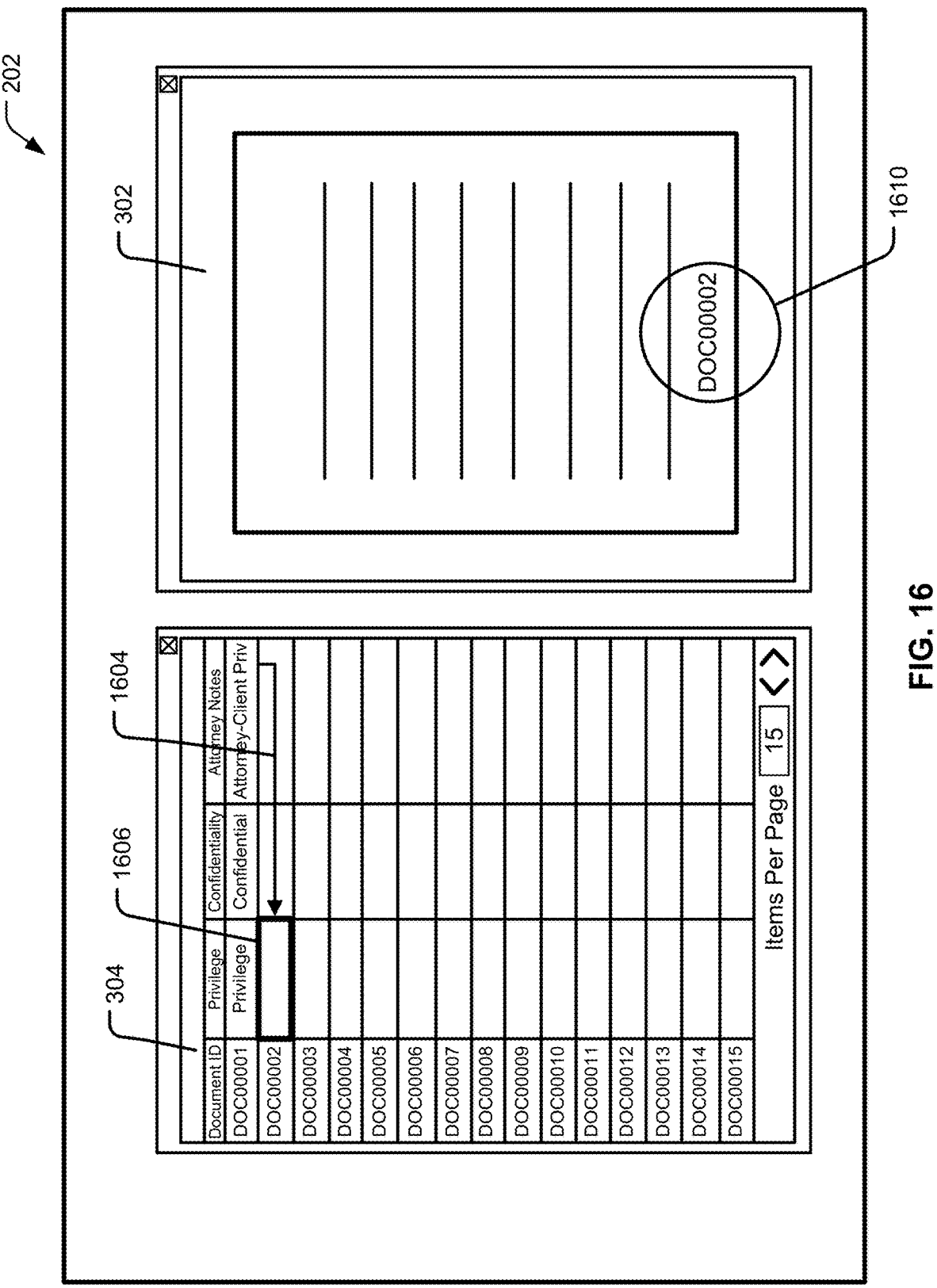
FIG. 16 is an illustration of the Tab key being used to move focus from a last editable cell in a first row to a first editable cell within a second row of the grid view coding interface.

By way of another non-limiting example, referring to FIG. 15, the user 216 may use one or more arrow keys 1502 to navigate between the cells of the array 334. For illustrative purposes, FIG. 15 illustrates the arrow keys 1502 superimposed over the grid view coding interface 304. However, the arrow keys 1502 may be implemented as components of the keyboard. The arrow keys 1502 may include an up arrow key 1511, a down arrow key 1512, a left arrow key 1513, and/or a right arrow key 1514. Because, in this example, each row of cells corresponds to a different document, the user 216 may use the up and down arrow keys 1511 and 1512 to navigate between different documents. The right and left arrow keys 1513 and 1514 may be used to navigate between cells within the same row, which correspond to different fields for the same document.

Figure 18:
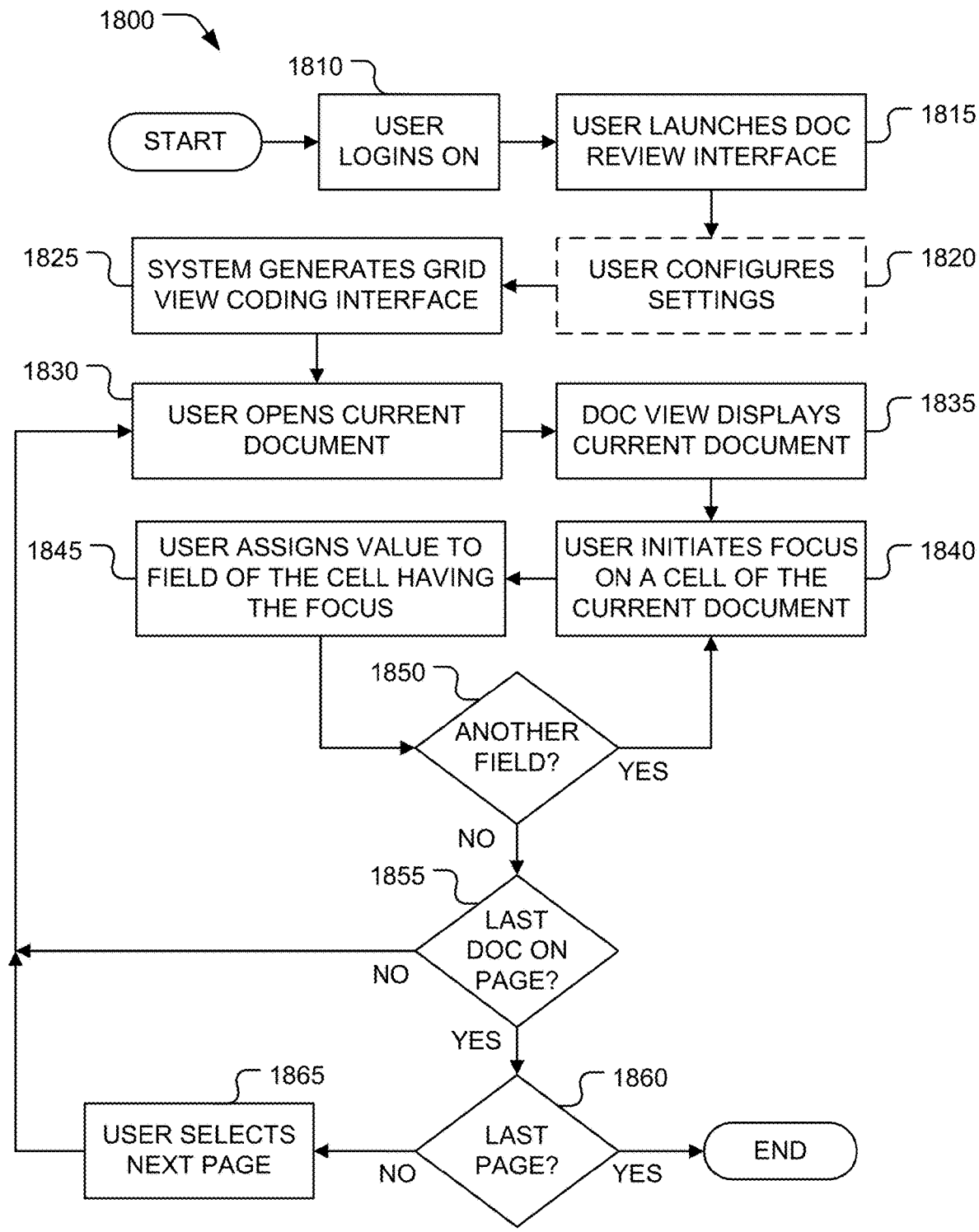
FIG. 18 is a flow diagram of a method performed by the system illustrated in FIG. 2.

FIG. 18 is a flow diagram of a method 1800 performed by the system 200 (see FIG. 2). The method 1800 may be used to implement a workflow using the document review interface 202. For example, the method 1800 may be performed when an attorney is tasked with reviewing 1,000 electronic documents that have been loaded into the review platform 236. In other words, the review queue of the attorney includes the 1,000 electronic documents. Before the method 1800 is performed, the application 212 has been installed (e.g., within the review platform 236). In first block 1810, the user 216 logs in to the review platform 236. In next block 1815, the user 216 launches the document review interface 202, which enables the grid view coding interface 304 (see FIGS. 3-10A and 11-17B) and launches the document viewer interface 302 (see FIGS. 3-9 and 12-17B). Then, in optional block 1820, the user 216 configures one or more of the user-defined settings. As mentioned above, referring to FIG. 10A, the user 216 may select on or more fields that the user 216 would like to code during the review. Referring to FIG. 3, the user 216 may use the user input 310 (e.g., a text box) to select a number of documents (e.g., 15) to be displayed in the grid view coding interface 304. As mentioned above, each row of the grid view coding interface 304 may display the values of the selected field(s) for one of these documents.

Then, in block 1825, the server 206 generates the grid view coding interface 304 with the plurality of rows 306 (see FIG. 3) each representing a different document and the plurality of columns 308 (see FIG. 3) each representing one of the selected fields. As mentioned above, the array 334 (see FIG. 3) of cells are defined by the plurality of rows 306 and the plurality of columns 308.

In block 1830, referring to FIG. 2, the user 216 opens a current document in the review queue 240 of the user 216. In the example illustrated in FIG. 8, the user 216 has opened the document having the value "DOC0001" in the document ID field 231 (see FIG. 2). In FIG. 8, the value ("DOC0001") of the document ID field of the current document is identified by a circle 810.

In block 1835 (see FIG. 18), the server 206 and/or the document review interface 202 automatically instructs the document viewer interface 302 to display the current document, which the document viewer interface 302 does in accordance with this instruction.

In block 1840 (see FIG. 18), the user 216 initiates focus in one of the fields of the first document. In the example illustrated in FIG. 8, the user 216 uses the mouse to initiate focus in the privilege field 232 (see FIG. 2) for the first document.

In block 1845 (see FIG. 18), the user 216 selects a value to assign to the field having the focus (e.g., the privilege field 232). In the example illustrated in FIG. 8, the user 216 uses the mouse to select the value "Privilege" and presses an "Enter" key of the keyboard to apply the code to the selected field.

In decision block 1850 (see FIG. 18), the user 216 decides whether to code another field of the current document. The decision in decision block 1850 is "YES," when the user 216 decides to code another field of the current document. Otherwise, the decision in decision block 1850 is "NO."

When the decision in decision block 1850 (see FIG. 18) is "YES," the user 216 returns to block 1840 (see FIG. 18) and initiates focus in another cell of the current document corresponding to a different one of the fields. Thus, a loop including blocks 1840-1850 may be repeated until all of the fields of the current document have been coded. In the example illustrated in FIG. 12, after the privilege field 232 (see FIG. 2) is coded, in block 1840, the user 216 initiates focus in another one of the fields by pressing the Tab key to navigate to the confidentiality field 233 (see FIG. 2). Then, in block 1845 (see FIG. 18), the user 216 selects a value to assign to the confidentiality field 233. In the example illustrated in FIG. 15, the user 216 uses the mouse to select the value "Confidential" and presses the "Enter" key to apply the code to the confidentiality field 233 for the current document. After the confidentiality field 233 is coded, the decision in decision block 1850 is "YES," and in block 1840, the user 216 initiates focus in another one of the fields by pressing the Tab key to navigate to the attorney notes field 234. Then, in block 1845, the user 216 selects a value to assign to the attorney notes field 234. For example, referring to FIG. 16, the user 216 may use the mouse to select the value "Attorney Client Priv" and press the "Enter" key to apply the code to the attorney notes field 234.

Then, in decision block 1855 (see FIG. 18), the server 206 decides if the current document is the last document on the current page displayed by the grid view coding interface 304. The decision in decision block 1855 is "YES," when the current document is the last document on the current page displayed by the grid view coding interface 304. Otherwise, the decision in decision block 1855 is "NO."

When the decision in decision block 1855 is "NO," the user 216 returns to block 1830 (see FIG. 18) and opens a different document on the current page as the current document. In the example, illustrated in FIG. 16, the user 216 presses the Tab key and navigates (illustrated by an arrow 1604) to the first editable cell 1606 in the row of the second document on the current page, which in this example is in the column of the privilege field 232. The second document becomes the current document (identified by a circle 1610). Then, the server 206 and/or the document review interface 202 return to block 1835 where the server 206 and/or the document review interface 202 instruct the document viewer interface 302 to display the current document. Blocks 1830-1855 may be repeated until all of the documents listed in the current page have been coded.

When the decision in decision block 1855 is "YES," the user 216 has completed coding all of the (e.g., 15) documents on the current page currently displayed by the grid view coding interface 304. When this is the case, in decision block 1860 (see FIG. 18), the server 206 and/or the document review interface 202 decides whether the current page of the grid view coding interface 304 is the last page. Referring to FIG. 18, the decision in decision block 1860 is "YES," when the current page is the last page. Otherwise, the decision in decision block 1860 is "NO."

When the decision in decision block 1860 is "YES," the method 1800 terminates. On the other hand, when the decision in decision block 1860 is "NO," in block 1865, the user 216 selects the next page user input 340 (see FIGS. 3-9, 12, 14, 17A, and 17B). Blocks 1830-1865 may be repeated until all of the documents in the review queue 240 of the user 216 have been coded.

Figure 4:
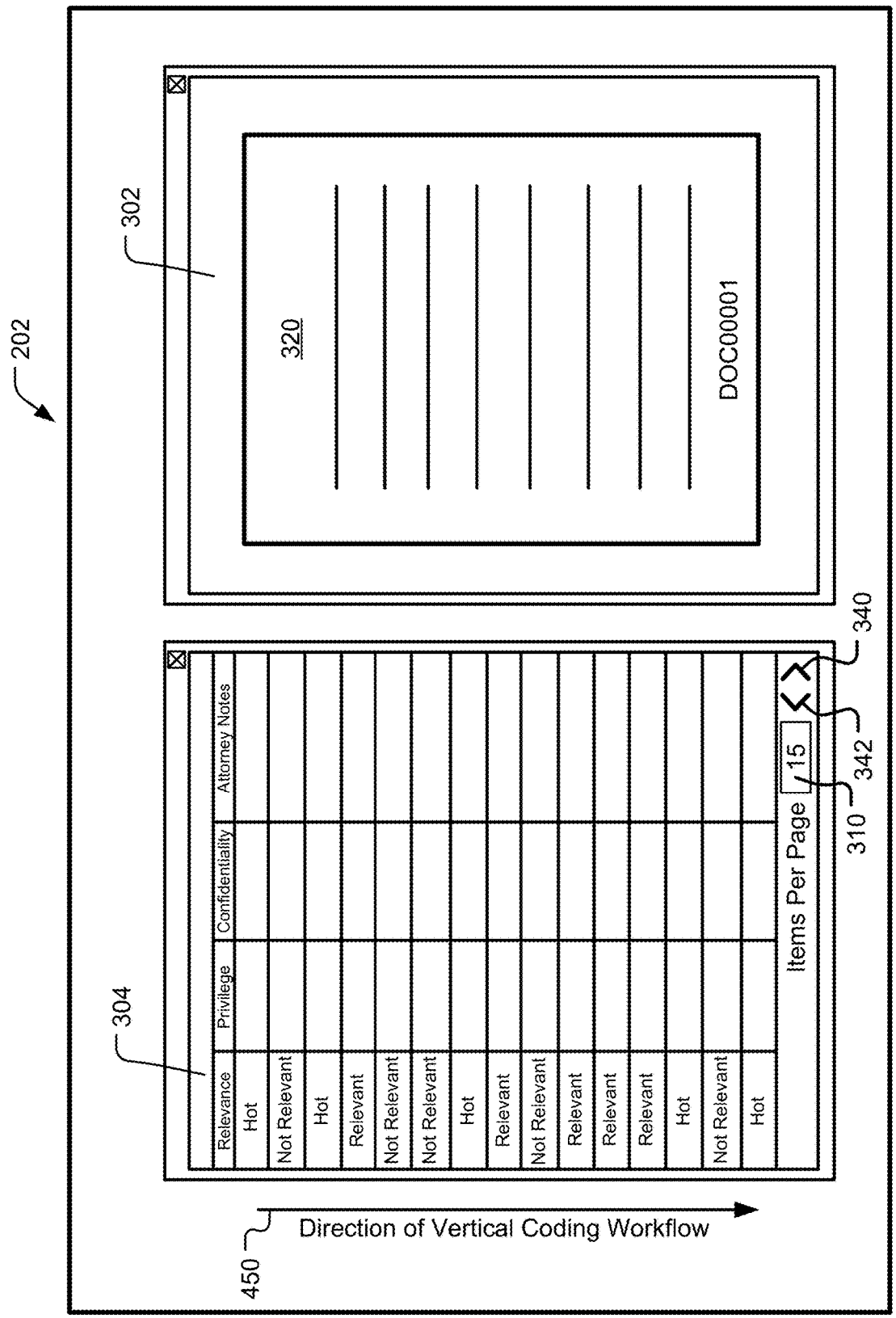
FIG. 4 is an illustration of the grid view coding interface in which data has been entered into a column of cells representing a relevance field for the plurality of documents according to a vertical coding workflow.

Referring to FIG. 4, the grid view coding interface 304 may be configured to provide particular value to document review projects that often includes coding subjective information (e.g., including relevance, responsiveness, and/or privilege designations) for a plurality of documents, quality control review projects that validate already-completed work product, and/or data entry projects that involve coding objective information (e.g., a date, a title, or an author) for a plurality of documents.

Figure 5:
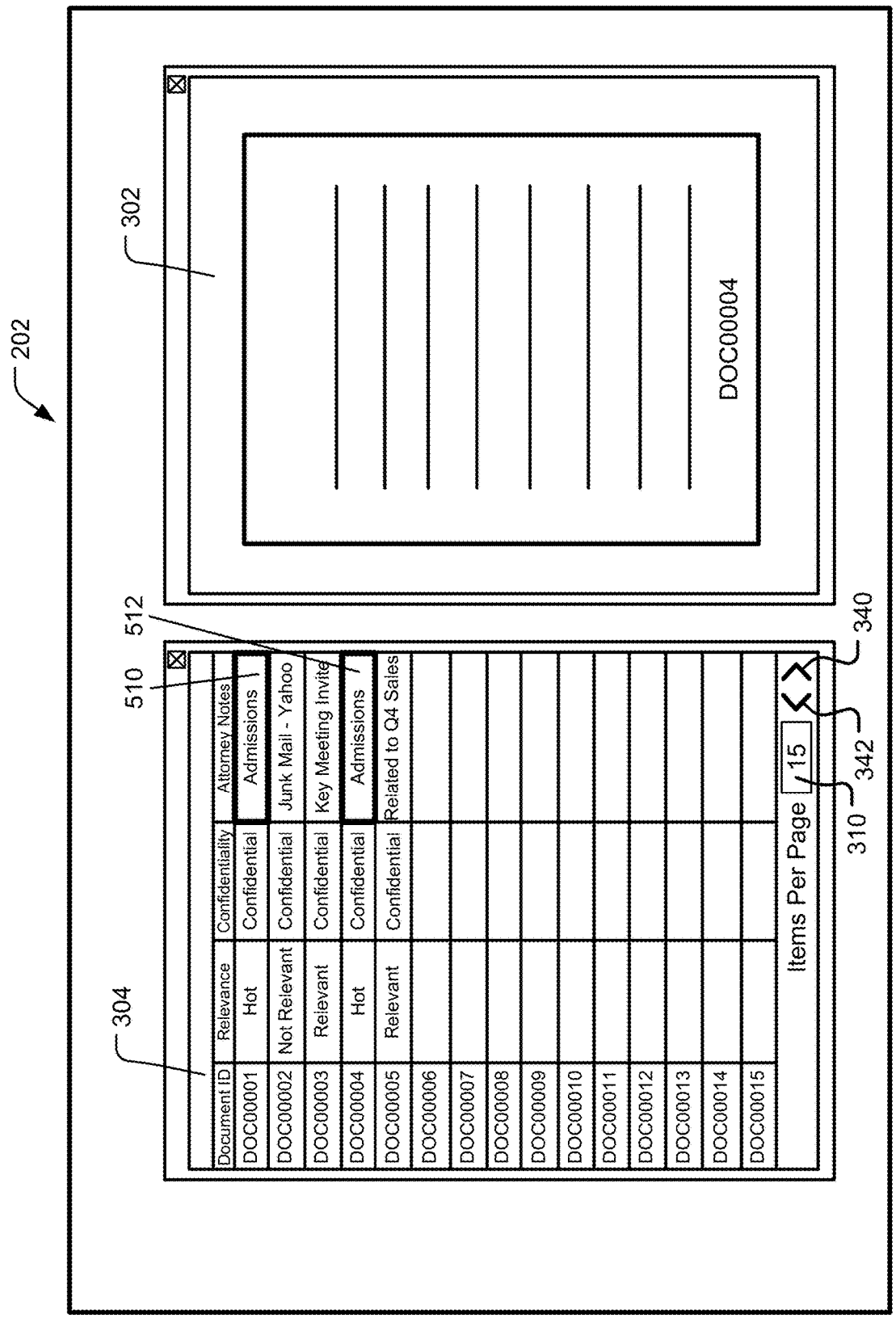
FIG. 5 is an illustration of the grid view coding interface being used to compare data entered into different rows representing different documents (documents "DOC00001" and "DOC00004") but within the same column representing an attorney notes field.
Figure 6:
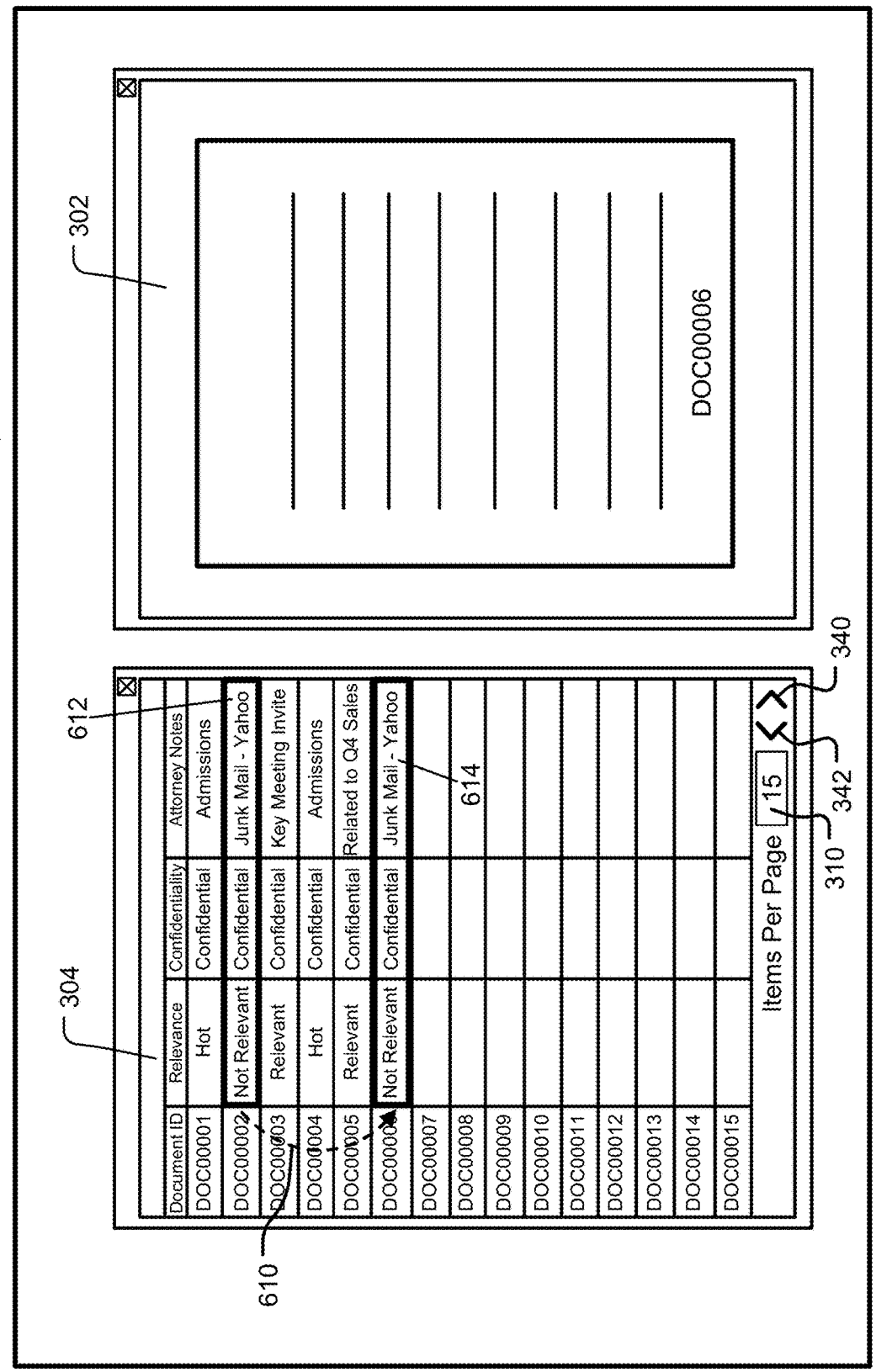
FIG. 6 is an illustration of values that were entered into editable cells of a first row of the grid view coding interface being copied and pasted into editable cells within a second row of the grid view coding interface.

The document review interface 202 improves upon the traditional coding interface 100 (see FIGS. 1A and 1B) in at least one or more of the following ways. First, the document review interface 202 eliminates the traditional document coding form 104 (see FIGS. 1A and 1B) altogether, increasing review speed by reducing latency between documents usually spent loading the document coding form 104. Second, the document review interface 202 accelerates the data entry workflow by allowing users to enter coding decisions in the grid view coding interface 304, as opposed to the document-specific document coding form 104 (see FIGS. 1A and 1B). Third, the document review interface 202 enables unique document review workflows, including a vertical coding workflow (identified by an arrow 450). Referring to FIG. 4, when the user 216 uses the vertical coding workflow, the user 216 enters information into the cells "vertically" (e.g., top to bottom or vice versa) within the same column of the grid view coding interface 304. Fourth, as shown in FIG. 5, the document review interface 202 improves accuracy by allowing users to view their already-completed coding on previous documents as they code new documents. In other words, the users are able to conduct their own quality control and/or data validation. For example, FIG. 5 illustrates the user 216 comparing the values entered into cells 510 and 512, which represent the same field (the attorney notes field 234) and were entered for different documents having the values "DOC0001" and "DOC0004," respectively, in the document ID field 231. Fifth, as shown in FIG. 6, the document review interface 202 allows copy and paste functionality so that document coding entered in a first document may be copied and pasted into another second document. In other words, coding decisions may be replicated across multiple documents without retyping. In the example illustrated, a dashed arrow 610 illustrates the document coding entered into the editable fields of a row 612 being copied and pasted into the editable fields of a row 614. Sixth, as shown in FIG. 7, the document review interface 202 enforces data entry rules using prescribed validation of entries (e.g. spell check, date format validation, etc.).

The document review interface 202 may be configured to provide cost savings. For example, the document review interface 202 may reduce the costs associated with document collection and review. Using the traditional coding interface 100 (see FIGS. 1A and 1B), the amount of time a user waits between documents for the next document to load often ranges from 4 seconds to 6 seconds. With a current industry average labor rate for attorney document review of around $50/hour, wasting only one second per document costs about $13,888.88 for one million documents. Using the document review interface 202, per-document loading times are typically reduced to less than 1 second between documents, resulting in a savings of 3 seconds to 5 seconds per document. This yields about $41,666.67 to about $69,444.44 of savings per one million documents. In other words, because the document review interface 202 improves the function of the system 200 by reducing between document wait times, the document review interface 202 also saves money.

Computing Device

FIG. 19 is a diagram of hardware and an operating environment in conjunction with which implementations of the one or more computing devices of the system 200 may be practiced. The description of FIG. 19 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 19 includes a general-purpose computing device in the form of the computing device 12. Each of the computing devices of FIGS. 2, 10B, and 10C (including the client computing device 204, the server 206, the database 208, and the agent computing device 209) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 19 include a local-area network (LAN) 51 and a wide-area network (WAN) 52. Such networking environments are commonplace in offices, enterprise-wide computer networks, intranets and the Internet. The network 210 (see FIG. 2) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods and/or data flows (including the method 1800 illustrated in FIG. 18 and the data flows 1010 and 1050 illustrated in FIGS. 10B and 10C, respectively) described above. Such instructions may be stored on one or more non-transitory computer-readable media. The computer-executable code 1062 (see FIG. 10C) may be stored on one or more non-transitory computer-readable media.

In some embodiments, the system memory 22 stores computer executable instructions that when executed by one or more processors cause the one or more processors to generate the interfaces 202, 302, and 304 illustrated in FIGS. 3-8 and 12-17B, and the field selection interface 1000 illustrated in FIG. 10A. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A computer-implemented method comprising:
generating, by at least one computing system, a graphical user interface comprising a user input;
receiving, by the graphical user interface, a numerical value input into the user input;
generating, by the at least one computing system, a first coding interface displaying a first grid with a plurality of first rows and a plurality of columns, the first grid comprising a plurality of cells with a different one of the plurality of cells being positioned at each intersection of one of the plurality of first rows and one of the plurality of columns, the plurality of first rows representing a plurality of first documents, the plurality of columns representing a plurality of fields, the plurality of first documents comprising a first number of documents that is equal to the numerical value;
receiving, by the graphical user interface, a selection of one of the plurality of cells located at an intersection of a selected row of the plurality of first rows and a selected column of the plurality of columns, the selected row representing a selected document of the plurality of first documents, the selected column representing a selected field of the plurality of fields;
automatically displaying, by the graphical user interface, a rendering of the selected document in a document viewer interface in response to receiving the selection;
receiving, by the graphical user interface, a value entered into the selected cell;
transmitting, by the graphical user interface, the value to a database for storage thereby; and
replacing, by the graphical user interface, the first coding interface with a second coding interface, the second coding interface displaying a second grid with a plurality of second rows and the plurality of columns, the plurality of second rows representing a plurality of second documents, the plurality of second documents comprising a second number of documents that is less than or equal to the numerical value.

2. The computer-implemented method of claim 1, wherein the selected cell is a first cell, the selected row is a first row, the selected document is a first document, the selected column is a first column, the selected field is a first field, the rendering is a first rendering, the value is a first value, and the computer-implemented method further comprises:
receiving, by the graphical user interface, a selection of a second cell of the plurality of cells located at an intersection of a selected second row of the plurality of first rows and a selected second column of the plurality of columns, the selected second row representing a selected second document of the plurality of first documents, the selected second column representing a selected second field of the plurality of fields, the selected second document being different from the first document;
automatically replacing, by the graphical user interface, the first rendering in the document viewer interface with a second rendering of the selected second document;
receiving, by the graphical user interface, a second value entered into the second cell; and
transmitting, by the graphical user interface, the second value to the database for storage thereby.

3. The computer-implemented method of claim 2, wherein the at least one computing system comprises a keyboard with a tab key, and
the selection of the second cell is received after the tab key is actuated while focus is on the first cell thereby moving the focus to the second cell.

4. The computer-implemented method of claim 2, wherein the at least one computing system comprises a keyboard with an up arrow key and a down arrow key, and
the selection of the second cell is received after one of the up arrow key or the down arrow key is actuated while focus is on the first cell thereby moving the focus to the second cell.

5. The computer-implemented method of claim 2, wherein the at least one computing system comprises a pointing device, and
the selection of the second cell is received after the pointing device causes focus to move from the first cell to the second cell.

6. The computer-implemented method of claim 1, wherein the selected cell is a first cell, the selected column is a first column, the selected field is a first field, the value is a first value, and the computer-implemented method further comprises:
receiving, by the graphical user interface, a selection of a second cell of the plurality of cells located at an intersection of the selected row and a selected second column of the plurality of columns, the selected second column representing a selected second field of the plurality of fields, the selected second field being different from the first field;
receiving, by the graphical user interface, a second value entered into the second cell; and
transmitting, by the graphical user interface, the second value to the database for storage thereby.

7. The computer-implemented method of claim 6, wherein the at least one computing system comprises a keyboard with a tab key, and
the selection of the second cell is received after the tab key is actuated while focus is on the first cell thereby moving the focus to the second cell.

8. The computer-implemented method of claim 6, wherein the at least one computing system comprises a keyboard with a left arrow key and a right arrow key, and
the selection of the second cell is received after one of the left arrow key or the right arrow key is actuated while focus is on the first cell thereby moving the focus to the second cell.

9. The computer-implemented method of claim 6, wherein the at least one computing system comprises a pointing device, and
the selection of the second cell is received after the pointing device causes focus to move from the first cell to the second cell.

10. The computer-implemented method of claim 1, wherein the selected row is a selected first row, the selected column is a selected first column, the selected field is a selected first field, the plurality of cells is a plurality of first cells, the rendering is a first rendering, the graphical user interface comprises a next page user input, and the computer-implemented method further comprises:
receiving, by the graphical user interface, a selection of the next page user input, wherein the first coding interface is replaced with the second coding interface in response to receiving the selection of the next page user input, and the second grid comprises a plurality of second cells with a different one of the plurality of second cells being positioned at each intersection of one of the plurality of second rows and one of the plurality of columns;

receiving, by the graphical user interface, a selection of one of the plurality of second cells located at an intersection of a selected second row of the plurality of second rows and a selected second column of the plurality of columns, the selected second row representing a selected second document of the plurality of second documents, the selected second column representing a selected second field of the plurality of fields; and automatically replacing, by the graphical user interface, the first rendering in the document viewer interface with a second rendering of the selected second document.

11. The computer-implemented method of claim 1, wherein the selected row is a first row, and the computer-implemented method further comprises:

receiving, by the graphical user interface, a selection of one or more first editable cells located in the first row;

copying, by the graphical user interface, values in the one or more first editable cells;

receiving, by the graphical user interface, a selection of one or more second editable cells located in a second row of the plurality of first rows, the second row being different from the first row, the one or more first editable cells and the one or more second editable cells being located in a same set of the plurality of columns; and pasting, by the graphical user interface, the copied values into the one or more second editable cells.

12. The computer-implemented method of claim 1, further comprising:

validating, by the graphical user interface, the value by comparing the value to a set of pre-defined parameters or a set of document coding rules.

13. The computer-implemented method of claim 12, further comprising:

highlighting, by the graphical user interface, the selected row with a first color when the value is valid; and highlighting, by the graphical user interface, the selected row with a second color when the value is invalid, the second color being different from the first color.

14. The computer-implemented method of claim 1, further comprising:

displaying, by the graphical user interface, a user interface to receive identifications of editable fields comprising those of the plurality of fields that are editable, those of the plurality of cells located in those of the plurality of columns representing the editable fields being editable.

15. The computer-implemented method of claim 1, wherein the first coding interface is displayed alongside the document viewer interface in the graphical user interface.

16. A system comprising:

a data store to store a plurality of electronic documents and a plurality of fields; and a server to:

transmit first information to a client computing device to display a graphical user interface;

receive a numerical value from the graphical user interface;

transmit second information to the client computing device to display a first coding interface, the first coding interface to display a first grid comprising an X-axis and a Y-axis, a first document axis comprising one of the X-axis and the Y-axis to display a plurality of first document identifier values each representing a different one of the plurality of electronic documents, a field axis comprising a different one of the X-axis and the Y-axis to display a plurality of field identifier values each representing a different one of the plurality of fields, the plurality of first document identifier values comprising a first number of values that is equal to the numerical value, the first grid to comprise a plurality of cells each located at a different position in the first grid to correspond to a corresponding document identifier value in the plurality of first document identifier values and a corresponding field identifier value in the plurality of field identifier values;

receive user input from the graphical user interface that was input into a portion of the plurality of cells;

transmit the user input to the data store for storage thereby;

receive, from the client computing device, a selection of one of the plurality of cells located at a selected position in the first grid;

transmit to the client computing device for display thereby in a document viewer interface, a rendering of a selected one of the plurality of electronic documents represented by a document identifier value corresponding to the selected position in the first grid in response to receiving the selection; and replace the first coding interface with a second coding interface, the second coding interface to display a second grid with a second document axis to display a plurality of second document identifier values representing ones of the plurality of electronic documents, the plurality of second document identifier values to comprise a second number of values that is less than or equal to the numerical value.

17. The system of claim 16, wherein the graphical user interface is to display a user interface to receive identifications of editable fields comprising those of the plurality of fields that are editable, the portion of the plurality of cells comprising those of the plurality of cells located in a position within the first grid that corresponds to a field identifier value in the plurality of field identifier values that represents one of the editable fields, receive the identifications of the editable fields from the client computing device, and store field configuration information in the data store indicating the editable fields are editable.

18. The system of claim 16, wherein the graphical user interface is to display a user interface to receive identifications of editable fields comprising those of the plurality of fields that are editable, the server is to receive a first request from the client computing device to associate configuration objects with the editable fields; and send a second request to the data store, the second request indicating that the configuration objects are to be associated with the editable fields, the data store is to create and associate a configuration object of the configuration objects with each of the editable fields, the configuration object indicating that the associated editable field is editable, and at least one of the server or the data store is to provide the configuration object associated with each of the editable fields to the client computing device whereat the graphical user interface is to display the portion of the plurality of cells based on the configuration object received for each of at least a portion of the editable fields.

19. The system of claim 18, wherein the configuration object has a JavaScript Object Notation ("JSON") format.

20. The system of claim 16, wherein the client computing device is to display the first coding interface and the document viewer interface simultaneously in the graphical user interface.

21. A computer-implemented method comprising:
generating, by at least one computing system, a graphical user interface comprising a user input;
receiving, by the graphical user interface, a numerical value input into the user input;
displaying, by the graphical user interface, a first coding interface displaying a first grid with a plurality of first cells representing a plurality of first documents and a plurality of fields, each cell representing a different document and field, the plurality of first documents comprising a first number of documents that is equal to the numerical value;
receiving, by the graphical user interface, a selection of one of the plurality of first cells, the selected cell representing a selected document of the plurality of first documents, and a selected field of the plurality of fields;
automatically displaying, by the graphical user interface, a rendering of the selected document in a document viewer interface in response to receiving the selection;
receiving, by the graphical user interface, a value entered into the selected cell;
transmitting, by the graphical user interface, the value to a database for storage thereby in the selected field; and
replacing, by the graphical user interface, the first coding interface with a second coding interface, the second coding interface to display a second grid with a plurality of second cells representing a plurality of second documents and the plurality of fields, the plurality of second documents comprising a second number of documents that is less than or equal to the numerical value.

22. The computer-implemented method of claim 21, wherein the first grid has a plurality of rows and a plurality of columns with a different one of the plurality of first cells being positioned at each intersection of one of the plurality of rows and one of the plurality of columns,
the plurality of rows represents the plurality of first documents, and
the plurality of columns represents the plurality of fields.

23. The computer-implemented method of claim 21, wherein the selected cell is a first cell, the selected document is a selected first document, the selected field is a selected first field, the rendering is a first rendering, the value is a first value, and the computer-implemented method further comprises:
receiving, by the graphical user interface, a selection of a second cell of the plurality of first cells representing a selected second document of the plurality of first documents and a selected second field of the plurality of fields, the selected second document being different from the selected first document;
automatically replacing, by the graphical user interface, the first rendering in the document viewer interface with a second rendering of the selected second document;
receiving, by the graphical user interface, a second value entered into the second cell; and
transmitting, by the graphical user interface, the second value to the database for storage thereby in the selected second field.

24. The computer-implemented method of claim 21, wherein the first coding interface and the document viewer interface are displayed concurrently in the graphical user interface, and
the second coding interface and the document viewer interface are displayed concurrently in the graphical user interface.

* * * * *